US012640049B2

(12) United States Patent
Lemery

(10) Patent No.: US 12,640,049 B2
(45) Date of Patent: May 26, 2026

(54) VIRTUAL REALITY FORKLIFT SIMULATOR AND METHODS OF USE THEREOF

(71) Applicant: Kyler Lemery, Grain Valley, MO (US)

(72) Inventor: Kyler Lemery, Grain Valley, MO (US)

( * ) Notice: Subject to any disclaimer, the term of this patent is extended or adjusted under 35 U.S.C. 154(b) by 388 days.

(21) Appl. No.: 18/206,461

(22) Filed: Jun. 6, 2023

(65) Prior Publication Data

US 2024/0412658 A1     Dec. 12, 2024

(51) Int. Cl.
*G09B 9/052*     (2006.01)
*G06T 19/00*     (2011.01)

(52) U.S. Cl.
CPC ............ *G09B 9/052* (2013.01); *G06T 19/006* (2013.01)

(58) Field of Classification Search
CPC ... G09B 9/00; G09B 9/02; G09B 9/04; G09B 9/042; G09B 9/048; G09B 9/052; G06T 19/006
See application file for complete search history.

(56) References Cited

U.S. PATENT DOCUMENTS

| | | | | |
|---|---|---|---|---|
| 10,977,956 | B1 * | 4/2021 | Madison | A63F 13/211 |
| 11,164,479 | B1 * | 11/2021 | Madison | G02B 27/017 |
| 2004/0158476 | A1 * | 8/2004 | Blessinger | G06Q 50/205 |
| | | | | 705/326 |
| 2006/0040239 | A1 * | 2/2006 | Cummins | G09B 9/05 |
| | | | | 434/62 |
| 2008/0254417 | A1 * | 10/2008 | Mohamed | G09B 9/04 |
| | | | | 434/69 |

| | | | | |
|---|---|---|---|---|
| 2011/0216185 | A1 * | 9/2011 | Laws | H04N 7/18 |
| | | | | 348/121 |
| 2020/0319613 | A1 * | 10/2020 | Pappas | G05B 19/042 |
| 2022/0036130 | A1 * | 2/2022 | Miyamoto | G06F 18/214 |
| 2022/0276709 | A1 * | 9/2022 | MacNaughton | G06V 40/10 |

FOREIGN PATENT DOCUMENTS

| | | | | | |
|---|---|---|---|---|---|
| CN | 203444662 | U | * | 2/2014 | |
| CN | 204166724 | U | * | 2/2015 | |
| CN | 114202988 | A | * | 3/2022 | G09B 9/04 |
| CN | 217213989 | U | * | 8/2022 | |
| RU | 2018128141 | A | * | 2/2020 | E02F 9/166 |
| WO | WO-2017155488 | A1 | * | 9/2017 | B66F 9/075 |

OTHER PUBLICATIONS

"Slalom 3—Reverse, Tall Loads—Simlog Forklift Personal Simulator" by Simlog Incorporated. YouTube. [dated Feb. 21, 2018], [online ], [retrieved on Aug. 27, 2025]. <URL:https://www.youtube.com/watch?v=Bi90WXMkgSs>. Including Still Image of Video. 2 Pages. (Year: 2018).*
"Simlog—Forklift Simulator with Replica Controls" by Klein Educational Systems. YouTube. [dated Apr. 6, 2020], [online], [retrieved on Aug. 27, 2025]. < URL:https://www.youtube.com/watch?v=5Mef1psfgBM>. Including Still Image of Video. 2 Pages. (Year: 2020).*

* cited by examiner

*Primary Examiner* — Milap Shah
(74) *Attorney, Agent, or Firm* — Polsinelli PC

(57)     ABSTRACT
A virtual reality forklift simulator and methods of use thereof are described. The virtual reality forklift simulate may simulate real-world physics providing comprehensive and accurate training to a user. The virtual reality forklift simulator may comprise one or more controllers, a nontransitory computer readable medium, and a processor. The virtual reality forklift simulator may provide a user with objectives to complete, guidance, and warnings of unsafe conditions.

20 Claims, 16 Drawing Sheets

1100  1102  1104  1106  1108

302

304

306

300

600

602

100

600

704

702

602

700

706

1100

1102 1104 1106 1108

1110

706

1200

1214

1202

1212

1208

1210

1206

1204

706

706

706

1402

1404 1406 1408

1502 1500

2200

VIRTUAL REALITY FORKLIFT SIMULATOR AND METHODS OF USE THEREOF

FIELD

The present disclosure relates to a virtual reality forklift simulator and methods of use thereof. The virtual reality forklift simulator may be configured to provide hands on training for forklift operators.

BACKGROUND

For a person to be forklift certified, the person must complete an online or in-person educational course covering the controls, safety risks, forklift models, and various other aspects related to operating a forklift. Next, a potential forklift operator must complete hands-on training with a forklift per OSHA guidelines. Hands-on training may require several hours of in-person training at a site. Requiring not only the potential operator to travel to the site but also an instructor. Therefore, there is a need for a forklift simulator to reduce the costs of becoming a certified forklift operator.

As presented herein, a virtual reality forklift simulator has been developed to overcome these problems.

BRIEF SUMMARY

Provided herein is a method of training a user in forklift operation. The method can include: booting up a virtual reality forklift simulator having a virtual reality environment; instructing the user to complete one or more objectives using a virtual reality forklift; completing the one or more objectives using one or more hand controllers; and providing guidance and/or warnings to the user based on a performance of the user in the virtual reality forklift. The virtual reality forklift simulator can base movements of the virtual reality forklift on physics simulations, and the guidance and/or warnings can be provided by an assist overlay system in the virtual reality forklift simulator.

In various aspects, the one or more controllers may include: a right hand controller configured to be grasped by a right hand of the user, the right hand controller having a grip button and a trigger; a left hand controller configured to be grasped by a left hand of the user, the left hand controller having a grip button and a trigger; and a headset. The headset allows the user to see the virtual reality environment. Pressing the grip buttons can allow the user to grip an object in the virtual reality environment, pressing the trigger button of the right hand controller can accelerate the virtual reality forklift, and pressing the trigger button of the left hand controller can engage a brake on the virtual reality forklift.

In various aspects, the one or more objectives may include: securing safety equipment of the virtual reality forklift; driving the virtual reality forklift using various virtual reality forklift controls; loading cargo on a set of tynes of the virtual reality forklift using the various virtual reality forklift controls; transporting cargo using the virtual reality forklift using the various virtual reality forklift controls; and unloading cargo using the various virtual reality forklift controls. In some aspects, the guidance may be one or more of an objective arrow, highlighting a slot or slots of a pallet, prompts to use various virtual reality forklift controls, audio prompts, a guidance tablet with a text description of the one or more objectives.

In various aspects, the warnings may be one or more of a tilted virtual reality forklift warning, an excessive speed warning, a crash warning, a mishandling of cargo warning, or a damage to cargo warning. In an aspect, the virtual reality forklift simulator may be halted when a warning is displayed. In a further aspect, the method may include providing an evaluation to the user.

In various aspects, the virtual reality forklift and virtual reality environment may simulate real world physics. In an aspect, the virtual reality forklift may be simulated using four wheel colliders and a three-point suspension system. In an aspect, the three-point suspension system may create a safety triangle for the virtual reality forklift.

Further provided herein is a non-transitory computer readable medium storing instructions that, when executed by at least one processor, cause the at least one processor to perform operations for training a user in forklift operation. The operations may include: receiving a first input from a user to boot-up a virtual reality forklift simulator; receiving one or more inputs from one or more controllers operated by the user to move a virtual reality forklift; providing guidance to the user to complete one or more objectives; providing warnings to the user of an unsafe operation of the virtual reality forklift; and receiving a shut-down input from the user to turn the virtual reality forklift simulation off.

In various aspects, the non-transitory computer readable medium may store data from a user session. In an aspect, the data comprises successful completion of objectives, failure of objectives, unsafe operations of the virtual reality forklift, and time between boot-up and shut-down.

In various aspects, the one or more controllers may comprise: a right hand controller configured to be grasped by a right hand of the user having a grip button and a trigger button; a left hand controller configured to be grasped by a left hand of a user having a grip button and a trigger button; and a headset configured to allow the user to see a virtual reality environment. Pressing the trigger button of the right hand controller may send an acceleration input to the non-transitory computer readable medium to move the virtual reality forklift, and pressing the trigger button of the left hand controller may send a brake input to the non-transitory computer readable medium to slow the virtual reality forklift or stop the virtual reality forklift.

In various aspects, the one or more objectives may comprise: securing safety equipment of the virtual reality forklift by providing inputs to the one or more controllers; driving the virtual reality forklift by providing inputs to the one or more controllers; loading cargo on a set of tynes of the virtual reality forklift by providing inputs to the one or more controllers; transporting cargo using the virtual reality forklift by providing inputs to the one or more controllers; and unloading cargo by providing inputs to the one or more controllers.

In various aspects, the user may provide inputs to right hand controller, left hand controller, and headset. In an aspect, the inputs to the right hand controller, left hand controller, and headset may provide the inputs to the non-transitory computer readable medium causing the at least one processor to move the virtual reality forklift and objects in the virtual reality environment.

In various aspects, the non-transitory computer readable medium and processor may simulate a real world forklift in the virtual reality forklift simulator. In further aspects, the processor may be configured to provide an evaluation to the user after completion of a training session. In various aspects, the warnings may be based on unsafe conditions from the virtual reality forklift simulator based on real world physics.

Other aspects and iterations of the invention are described more thoroughly below.

BRIEF DESCRIPTION OF THE DRAWINGS

Implementations of the present technology will now be described, by way of example only, with reference to the attached figures, wherein.

DETAILED DESCRIPTION

Figure 1:
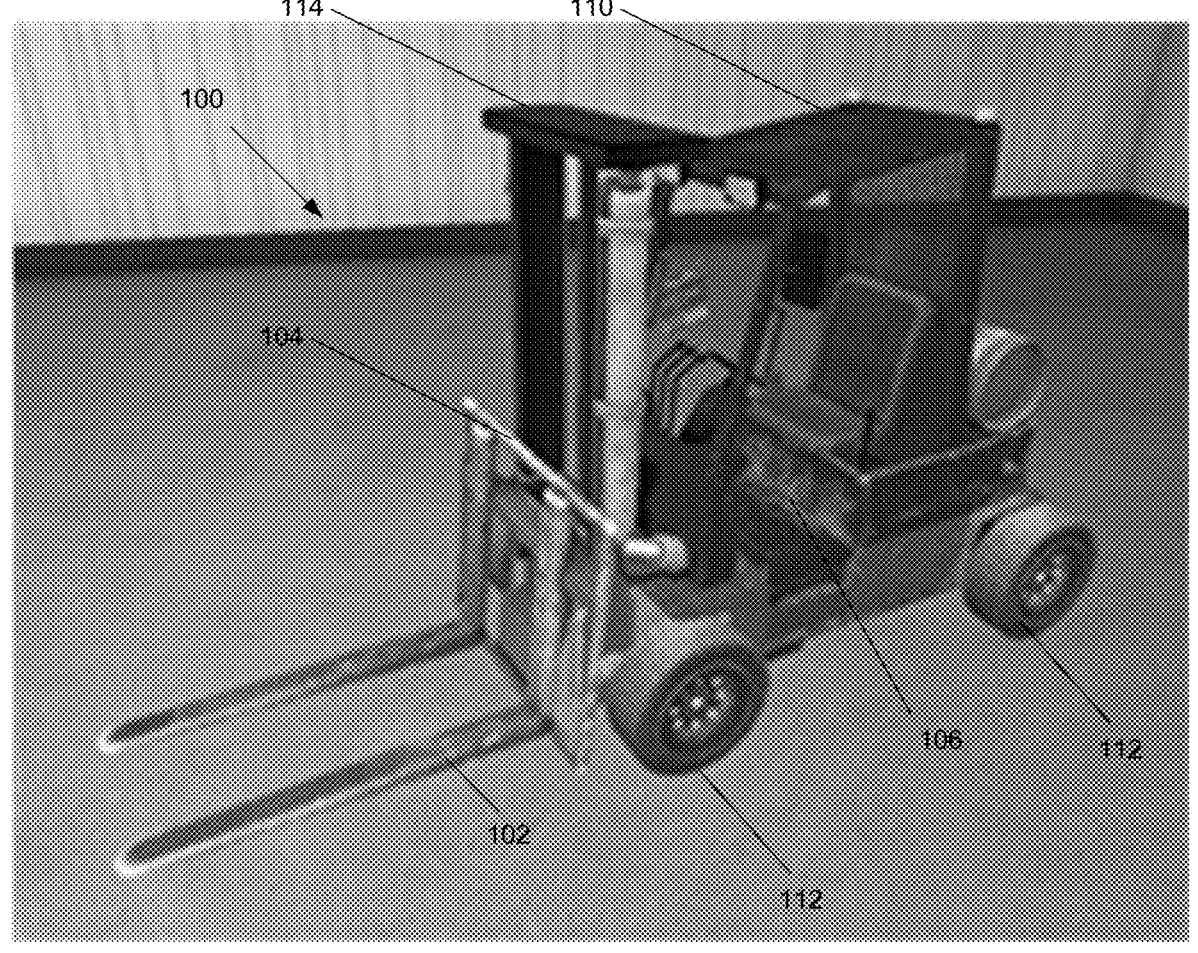
FIG. 1 is an example of a virtual reality forklift in one aspect.

It will be appreciated that for simplicity and clarity of illustration, where appropriate, reference numerals have been repeated among the different figures to indicate corresponding or analogous elements. In addition, numerous specific details are set forth in order to provide a thorough understanding of the examples described herein. However, it will be understood by those of ordinary skill in the art that the examples described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout the above disclosure will now be presented. As used herein, "about"

refers to numeric values, including whole numbers, fractions, percentages, etc., whether or not explicitly indicated. The term "about" generally refers to a range of numerical values, for instance, ±0.5-1%, ±1-5% or ±5-10% of the recited value, that one would consider equivalent to the recited value, for example, having the same function or result.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, "substantially cylindrical" means that the object resembles a cylinder but can have one or more deviations from a true cylinder.

The terms "comprising," "including" and "having" are used interchangeably in this disclosure. The terms "comprising," "including" and "having" mean to include, but not necessarily be limited to the things so described.

Provided herein is a virtual reality forklift simulator system for training a user in forklift operation. The virtual reality forklift simulator system may comprise a computing system to perform operations to allow a user to train in forklift operation. The virtual reality forklift simulator system may further include a headset, a right hand controller, and a left hand controller. The user may provide inputs to the system causing various movements to occur in the virtual reality forklift simulator using the right hand controller, the left hand controller, and the headset. The virtual reality forklift simulator may be physically simulated, such that the virtual reality environment, objects in the virtual reality environment, and the virtual reality forklift may operate and interact in a real world manner. The virtual reality forklift simulator may provide hands-on training for a user without the user needing to leave their home. Further, the virtual reality forklift simulator may provide a safe training course for a user. The virtual reality forklift simulator may make use of rigid body simulation with forces, joints, and other physical mechanics to provide an accurate representation of a real world forklift without any compromise to controllability.

Figure 2:
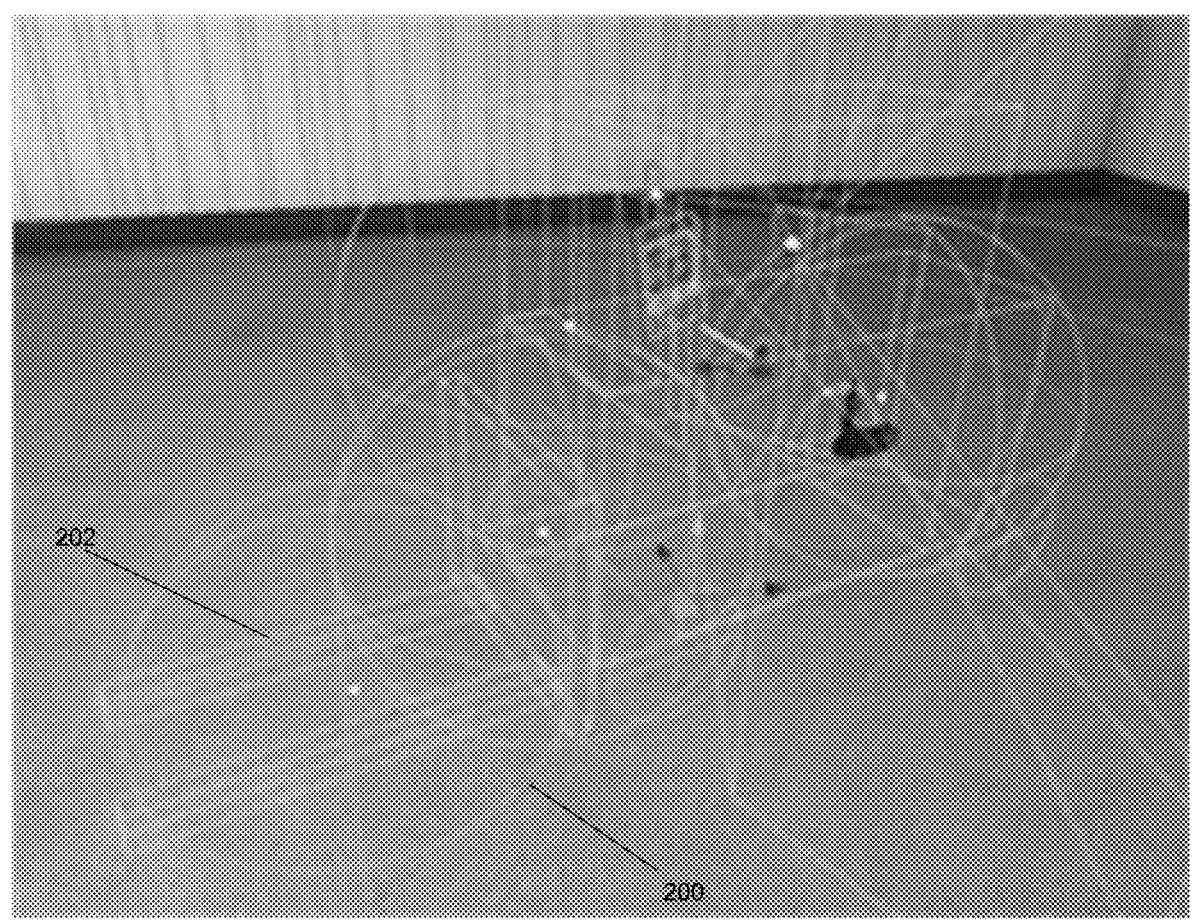
FIG. 2 is an example of an underlying physics system of the virtual reality forklift.

As illustrated in FIG. 1, the virtual reality forklift 100 may have a set of tynes 102, a load backrest 104, an interior 106, a body 108, an overhead guard 110, four tires 112, and a mast 114. As illustrated in FIG. 2, the virtual reality forklift 100 may have various colliders (e.g., box colliders, wheel colliders 200, and circle colliders) and rigid bodies 202 for simulating real world forklift physics.

Figure 3:
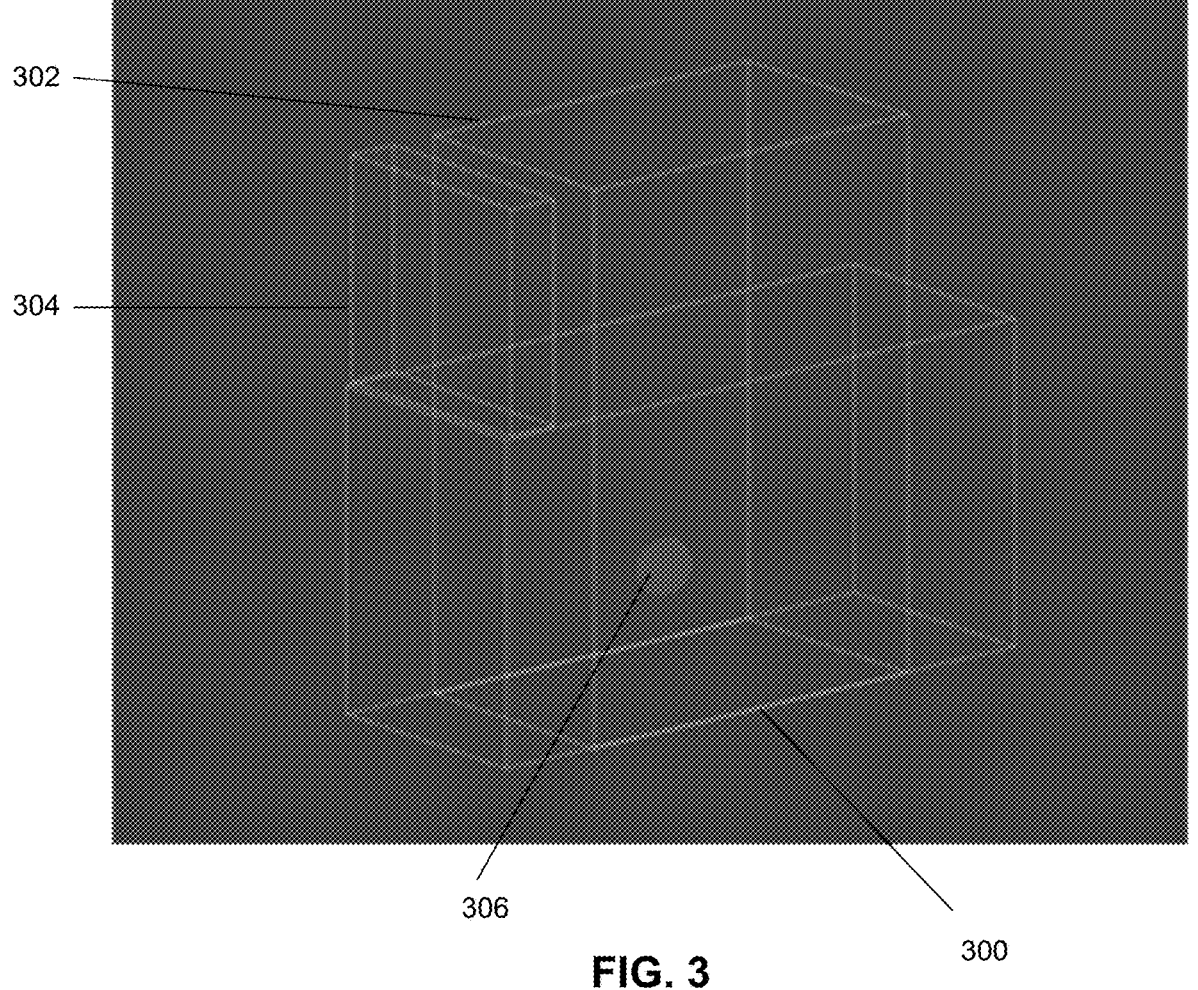
FIG. 3 is an example of an underlying physics system of a body of the virtual reality forklift.

FIG. 3 illustrates the rigid bodies for the body 108 of the virtual reality forklift 100. The virtual reality forklift may have a first rigid body 300. The first rigid body 300 may encompass the lower part of the body 108 (e.g., the area between the wheels on two sides of the body and the area between the mast 114 and the back end of the body). The virtual reality forklift 100 may have a second rigid body 302 that extends to the top of the overhead guard 110 and down through to the bottom of the body 108. The virtual reality forklift 100 may have a third rigid body 304 that encompasses the top portion of the mast 114. The body 108 of the virtual reality forklift may have a center of mass 306. The first rigid body 300, the second rigid body 302, and the third rigid body 304 may all have box colliders encompassing the rigid bodies. The first rigid body 300, second rigid body 302, and third rigid body 304 are configured to simulate real world movements of a forklift. For example, a force may be applied to the first rigid body 300 which may have a weight. The force provided the first rigid body may move the first rigid body 300 in a physically simulated way (e.g., depending on the weight of the first rigid body 300 and the force applied). In another example, the same force applied to the first rigid body 300 may also be applied to the second rigid body 302, such that the first rigid body 300 and the second rigid body 302 move in substantially the same way. In some examples, the first rigid body 300 and the second rigid body 302 may have physically simulated mechanical joints, such that the first rigid body 300 and the second rigid body 302 have a combined physically simulated weight. In another example, the first rigid body 300, second rigid body 302, and third rigid body 304 may all be connected with physically simulated mechanical joints. In some examples, the center of mass 306 of the virtual reality forklift may include a center of mass of a virtual reality forklift counterweight. In other examples, the center of mass 306 of the virtual reality forklift and the center of mass of the virtual reality counterweight may be simulated independently.

As illustrated in FIG. 2, the virtual reality forklift 100 may have box colliders and wheel colliders. The box colliders may be programmed to the surface of every rigid body of the virtual reality environment. The box colliders may be configured to provide a force to the rigid bodies when a box collider collides with another rigid body or collider in the virtual reality environment. In another aspect, the wheel colliders 200 may be configured to provide a three-point suspension system to the virtual reality forklift 100. In some examples, the virtual reality forklift may have three or more wheel colliders. In another example, the virtual reality forklift may have four wheel colliders. The three-point suspension system may be configured to provide a simulated safety triangle.

Figure 4:
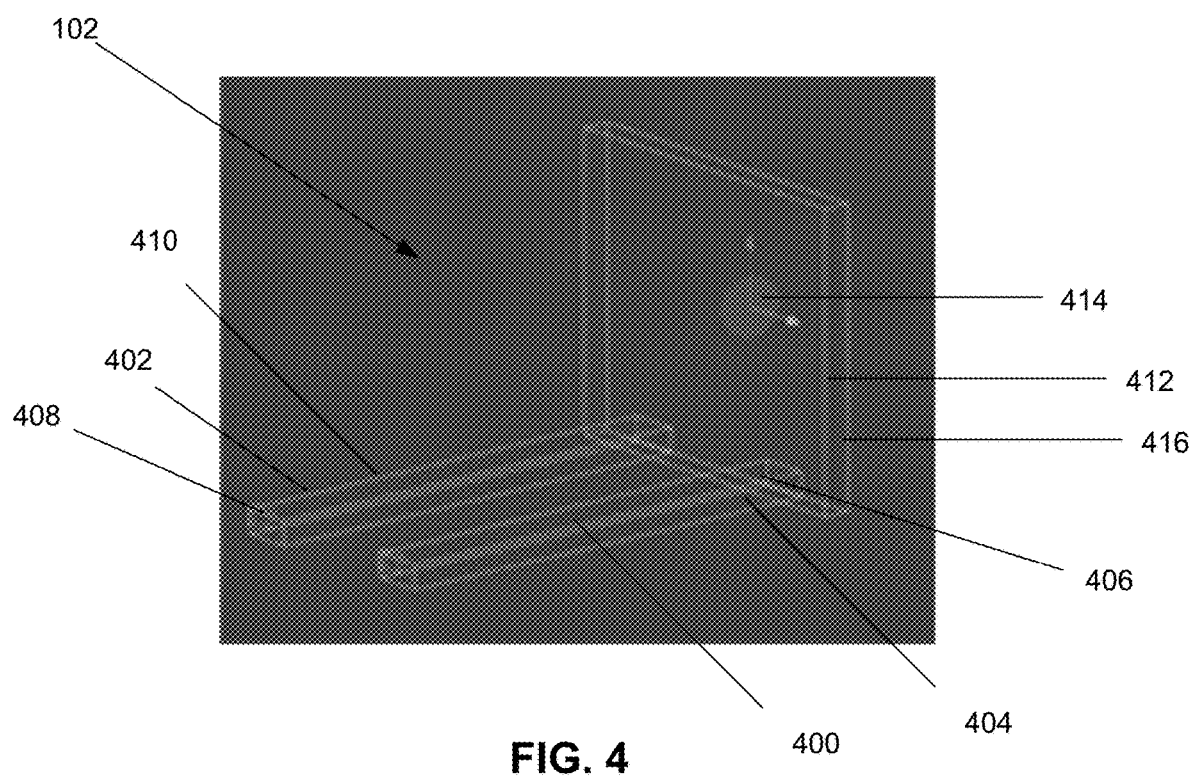
FIG. 4 is an example of an underlying physics system of a set of tynes and a mast of a virtual reality forklift.

As illustrated in FIG. 4, the tynes 102 of the virtual reality forklift 100 may each have their own box collider. For example, the first tyne 400 may have a rigid body 404 and a box collider 406 surrounding the rigid body 404. The second tyne 402 may have a rigid body 408 and a box collider 410 surrounding the rigid body 408. The tynes 102 may also have a load backrest rigid body 412 and a center of mass 414. The load backrest rigid body 412 of the tynes 102 may have a box collider 416. The tynes 102 of the virtual reality forklift 100 may be configured to operate in substantially the same way as real world tynes on a real world forklift. The tynes 102 may be attached to the mast 114 using a spring joint system. The box colliders 406, 410 may be configured to provide forces to other objects in the virtual reality environment when the box colliders 406, 410 run into other objects in the virtual reality environment. The mast 114 may be configured to move the tynes up and down. The rigid body 404 of the first tyne 400, the rigid body 408 of the second tyne 402 and load backrest rigid body 412 may be connected using simulated mechanical joints.

Figure 5:
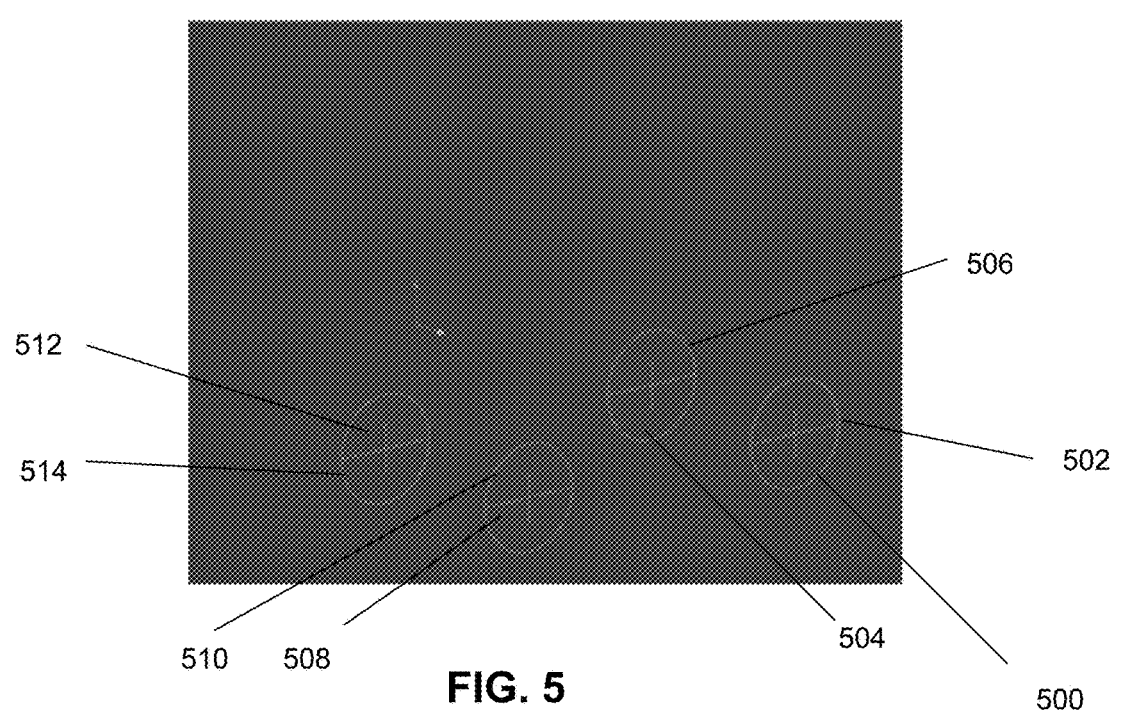
FIG. 5 is an example of an underlying physics system for four wheels of a virtual reality forklift.

As illustrated in FIG. 5, the virtual reality forklift may have four wheels. Each wheel may have its own rigid body 500, 504, 508, 512 and circle collider 502, 506, 510, 514. The circle colliders 502, 506, 510, 514 may be operable to provide a force to another object in the virtual reality environment when the circle colliders 502, 506, 510, 514 collide with another object in the virtual reality environment. The circle colliders 502, 506, 510, 514 may be configured to provide a friction force to the floor of the virtual reality environment when a torque is provided to the wheels. The wheels may be connected to the virtual reality forklift 100, such that when the wheels provide a friction force to the floor the virtual reality forklift 100 moves. The maximum speed of the virtual reality forklift 100 may be determined by a maximum motor torque and air drag applied to the rigid bodies of the virtual reality forklift 100. The visual models of the wheels may be set to match the states of the circle colliders 502, 506, 510, 514. In some examples, each wheel may be configured to support a portion of the center of mass 306 of the virtual reality forklift 100. When the portion of the center of mass 306 of the virtual reality forklift 100 on one or more wheels exceeds a threshold support on the one or more wheels, the forklift may exceed the safety triangle and begin to tilt in the direction of the one or more wheels that have an exceeded threshold support.

Figure 21:
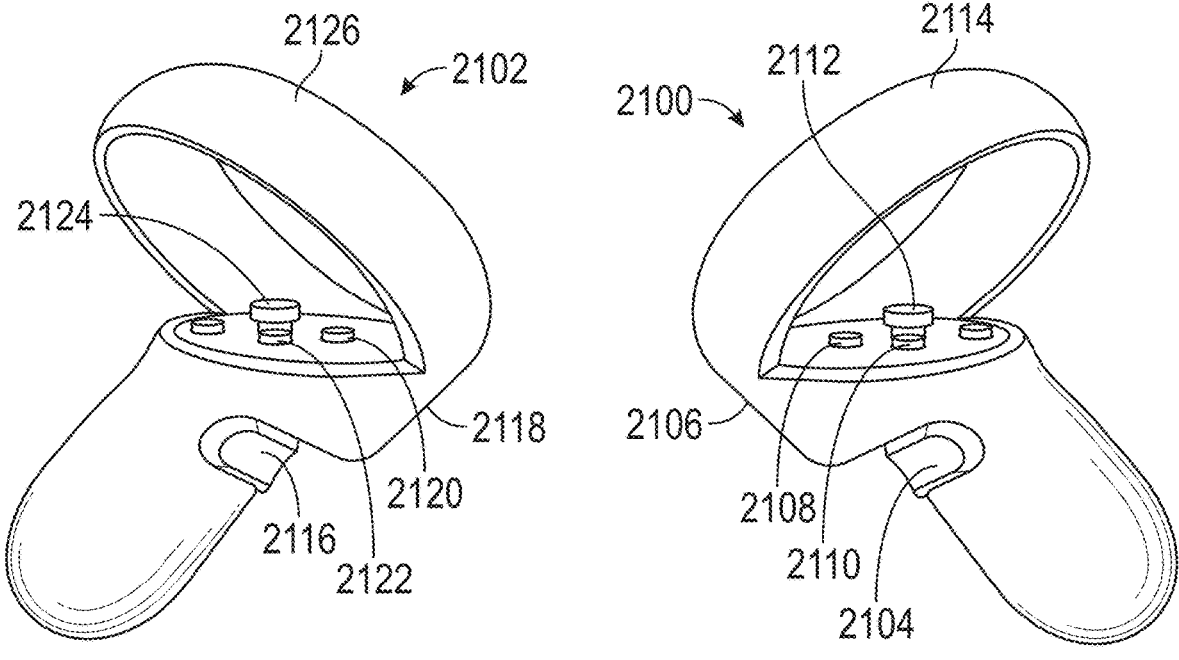
FIG. 21 is an example of a right hand controller and a left hand controller.

As illustrated in FIG. 21, a right hand controller 2100 and a left hand controller 2102 may be used to operate the virtual reality forklift 100 by providing inputs to the virtual reality forklift simulator. The right hand controller 2100 may have a grip button 2104, a trigger button 2106, a first selector button 2108, a second selector button 2110, a joystick 2112, and a guard 2114. The left hand controller may have a grip button 2116, a trigger button 2118, a first selector button 2120, a second selector button 2122, a joystick 2124, and a guard 2126.

Figure 22:
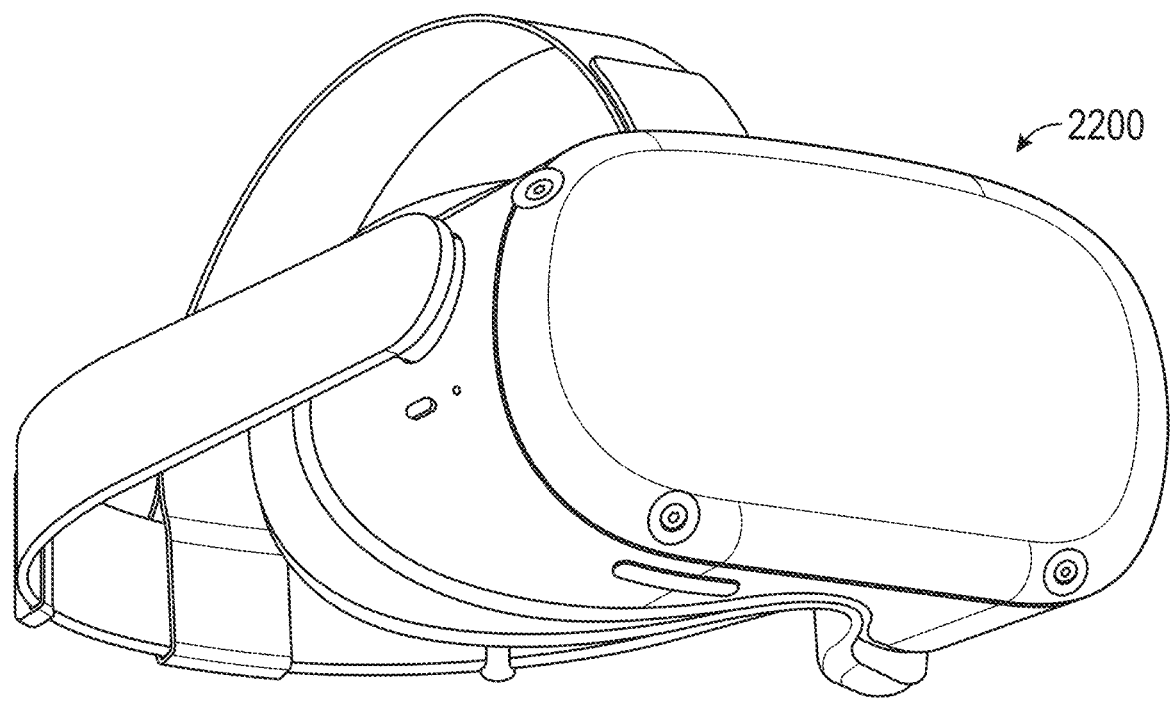
FIG. 22 is an example of a headset.

As illustrated in FIG. 22, a headset 2200 may be configured to place the user in the virtual reality forklift simulator. The headset may have an interior screen configured to allow the user to see the virtual reality forklift simulator environment. The headset may be configured to allow the user to look around the virtual reality forklift simulator environment. It will be appreciated that the headset may be any type of headset operable with a virtual reality simulator. The headset 2200 is an example only and other types of headsets may be used with the virtual reality forklift simulator.

The right hand controller 2100 and the left hand controller 2102 may be configured to simulate real world movements of a user's hands in the virtual reality forklift simulator. The right hand controller 2100 and the left hand controller 2102 may each have an invisible box around them. The invisible boxes may detect when specific interactable objects (e.g., levers, controls, steering wheels, keys, lap belt restraints, etc.) enter the invisible box. When the user presses the grip button 2104, 2116 while the specific object is in the invisible box, the specific object will be gripped by the respective hand. For example, when a user wants to grab an object in the virtual reality forklift simulator with their left hand, the user can hover their left hand over the object by moving the left hand controller 2102. The user may then grasp the object by holding down the grip button 2116 of the left hand controller 2102. The user may move the object by physically moving the left hand controller 2102 while grasping the object by holding down the grip button 2116 of the left hand controller 2102. For example, when a user wants to grab an object in the virtual reality forklift simulator with their right hand, the user can hover their right hand over the object by moving the right hand controller 2100. The user may then grasp the object by holding down the grip button 2104 of the right hand controller 2100. The user may move the object by physically moving the right hand controller 2100 while grasping the object by holding down the grip button 2104 of the right hand controller 2100.

The trigger button 2106 of the right hand controller 2100 may act as an accelerator (e.g., acceleration trigger). When a user presses the trigger button 2106 of the right hand controller 2100, a torque may be applied to the four wheels. In some examples, the force applied to the trigger button 2106 of the right hand controller 2100 by the user determines the amount of torque applied to the wheels of the virtual reality forklift 100. The trigger button 2118 of the left hand controller 2102 may act as a brake (e.g., brake trigger). When a user presses the trigger button 2118 of the left hand controller 2102, a friction force may be applied to the four wheels. In some examples, the force applied to the trigger button 2118 of the left hand controller 2102 by the user determines the amount of friction force applied to the wheels of the virtual reality forklift. The torque or friction force applied to the wheels may correspond to the wheels providing a friction force to the ground, allowing the virtual reality forklift 100 to move through the virtual reality environment in a physically simulated manner.

The first selector button 2108 of the right hand controller 2100 and the first selector button 2120 of the left hand controller 2102 may be configured to open a tile within the virtual reality forklift simulator or otherwise select or toggle various settings and texts in the virtual reality forklift simulator. The second selector button 2110 of the right hand controller 2100 and the second selector button 2122 of the left hand controller 2102 may be used to go back to a previous screen or exit a tile or settings menu of the virtual reality forklift simulator.

The joystick 2112 of the right hand controller 2100 and the joystick 2124 of the left hand controller 2102 may be configured to allow a user to move a virtual reality simulation of the user throughout the virtual reality forklift simulator. For example, either joystick 2112, 2124 may be operable to move a user from one location in the virtual reality forklift simulator environment to another location in the virtual reality forklift simulator environment.

In another aspect, the guard 2114 of the right hand controller 2100 and the guard 2126 of the left hand controller 2102 may be configured to protect a user from hitting objects within a real world environment while using the virtual reality forklift simulator.

Figure 6:
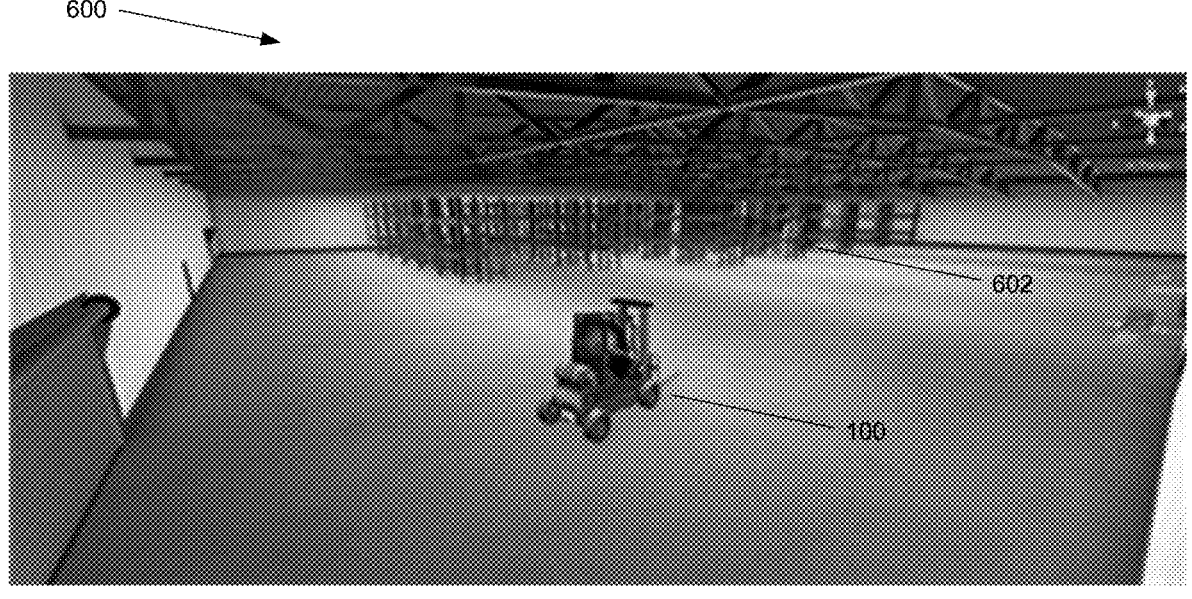
FIG. 6 is an example of a virtual reality forklift in a virtual reality environment.
Figure 7:
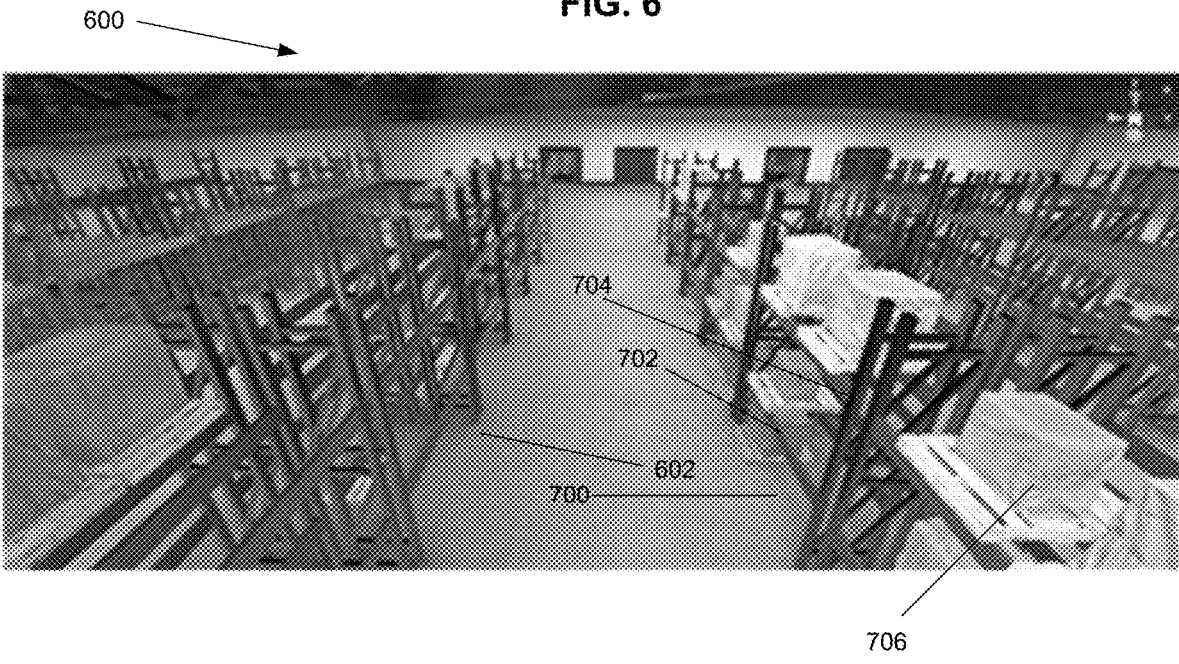
FIG. 7 is an example of a virtual reality environment.

As illustrated in FIGS. 6-10, the virtual reality forklift 100 may be within a virtual reality environment 600. As illustrated in FIGS. 6 and 7, the virtual reality environment 600 may have shelves 602. As illustrated in FIG. 7, the shelves 602 may have one or more levels. In one example, the shelves 602 may have three levels. The shelves 602 may have a first level 700 (e.g., on the ground), a second level 702 (e.g., a middle level), and a third level 704 (e.g., the highest level). The shelves 602 may be operable to hold a crate 706. In some examples, the shelves 602 may be configured to hold more than one crate. In other examples, the virtual reality environment may include one or more warehouse workers, providing opportunities for safety training in avoiding warehouse workers.

Figure 8:
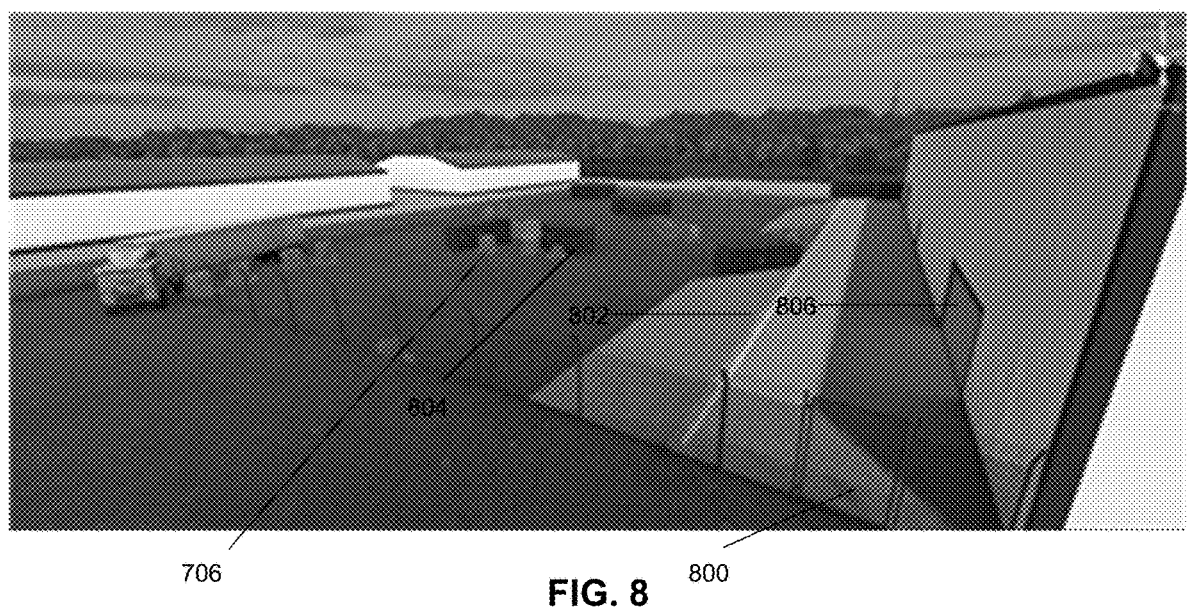
FIG. 8 is an example of a virtual reality environment.
Figure 9:
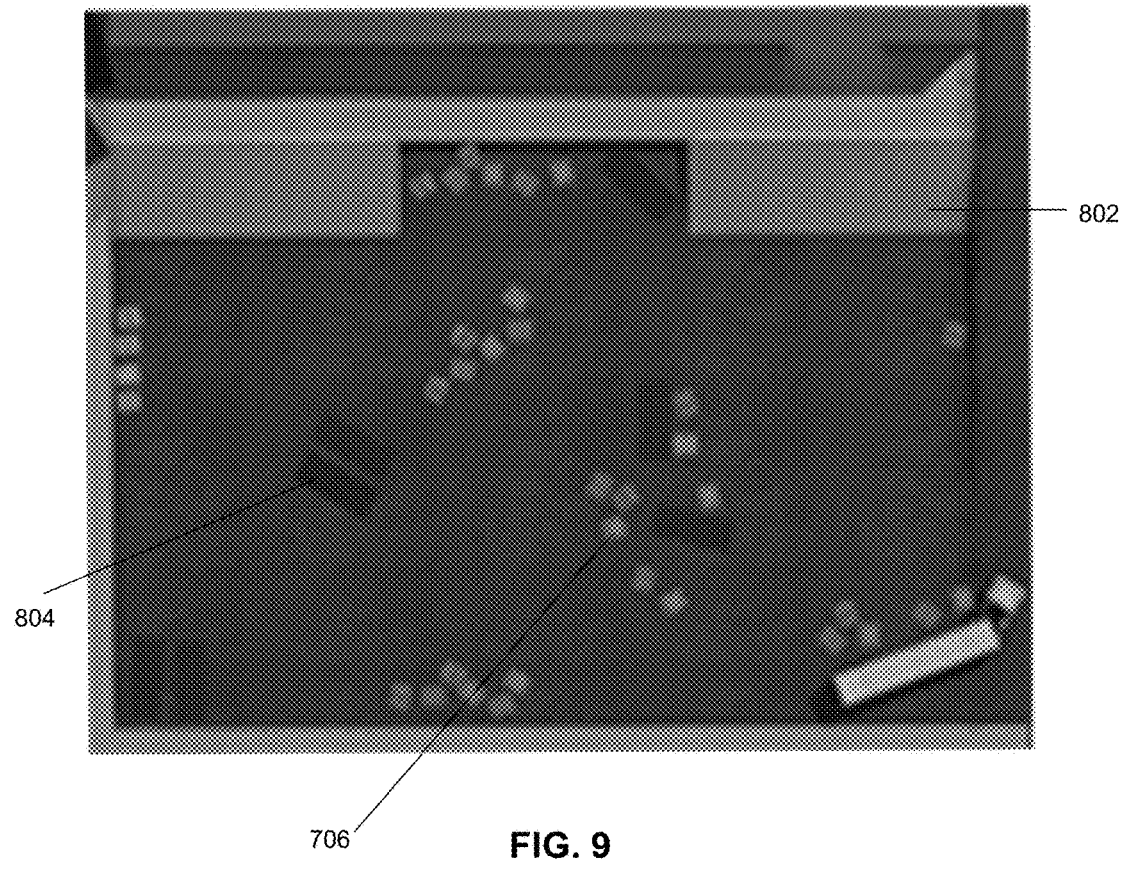
FIG. 9 is an example of a virtual reality environment.
Figure 10:
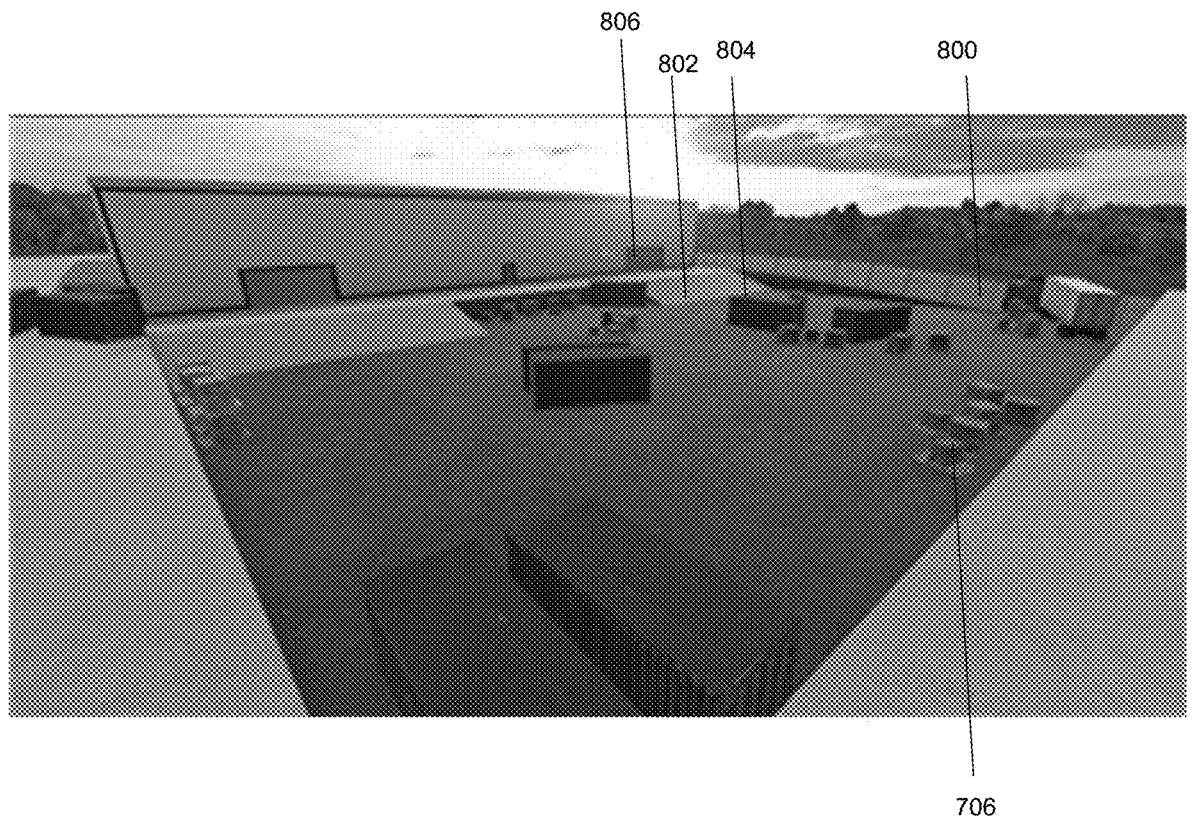
FIG. 10 is an example of a virtual reality environment.

As illustrated in FIGS. 8-10, the virtual reality environment 600 may include an outdoor environment. The outdoor environment may include a fence 800, a ramp 802, one or more shipping containers 804, at least one door 806, and a crate 706. In some examples, the outdoor environment may include multiple crates. The ramp 802 may provide a user an opportunity to train in driving a forklift on uneven ground. The one or more shipping containers 804 may provide obstacles for a user to maneuver around. The fence 800 may enclose the outdoor environment and provide another obstacle for a user to maneuver around.

Figure 11A:
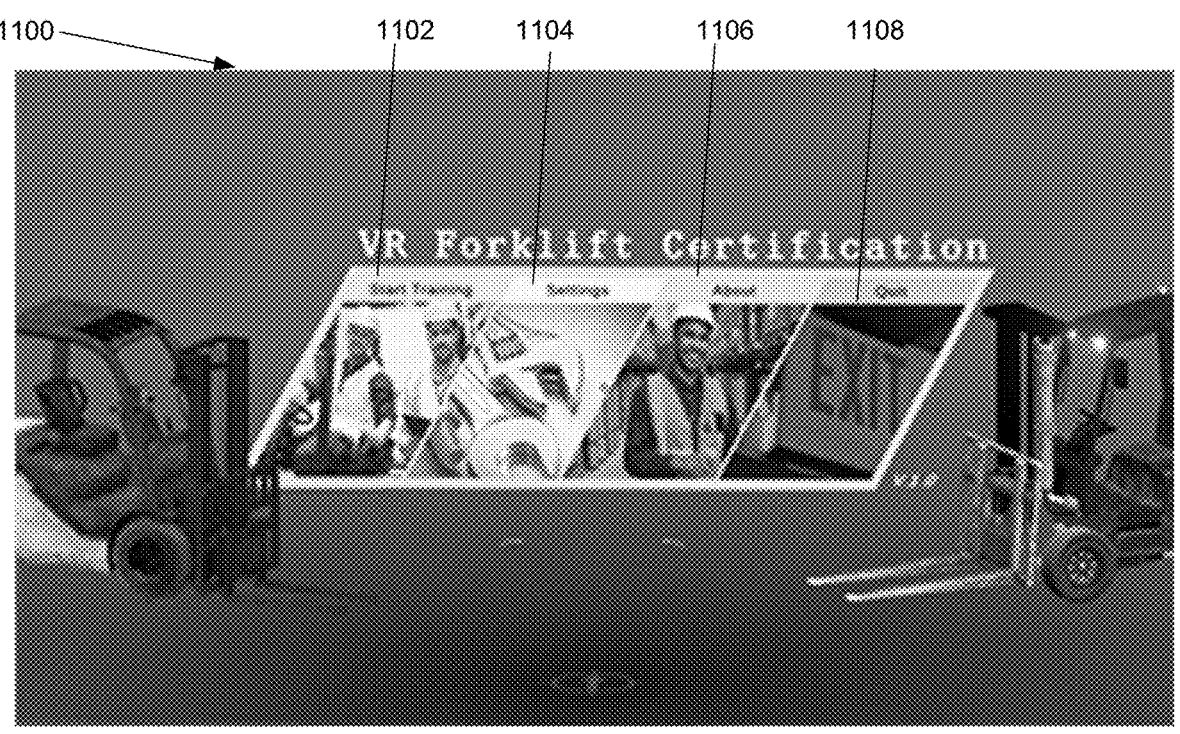
FIG. 11A is an example of a start menu.
Figure 11B:
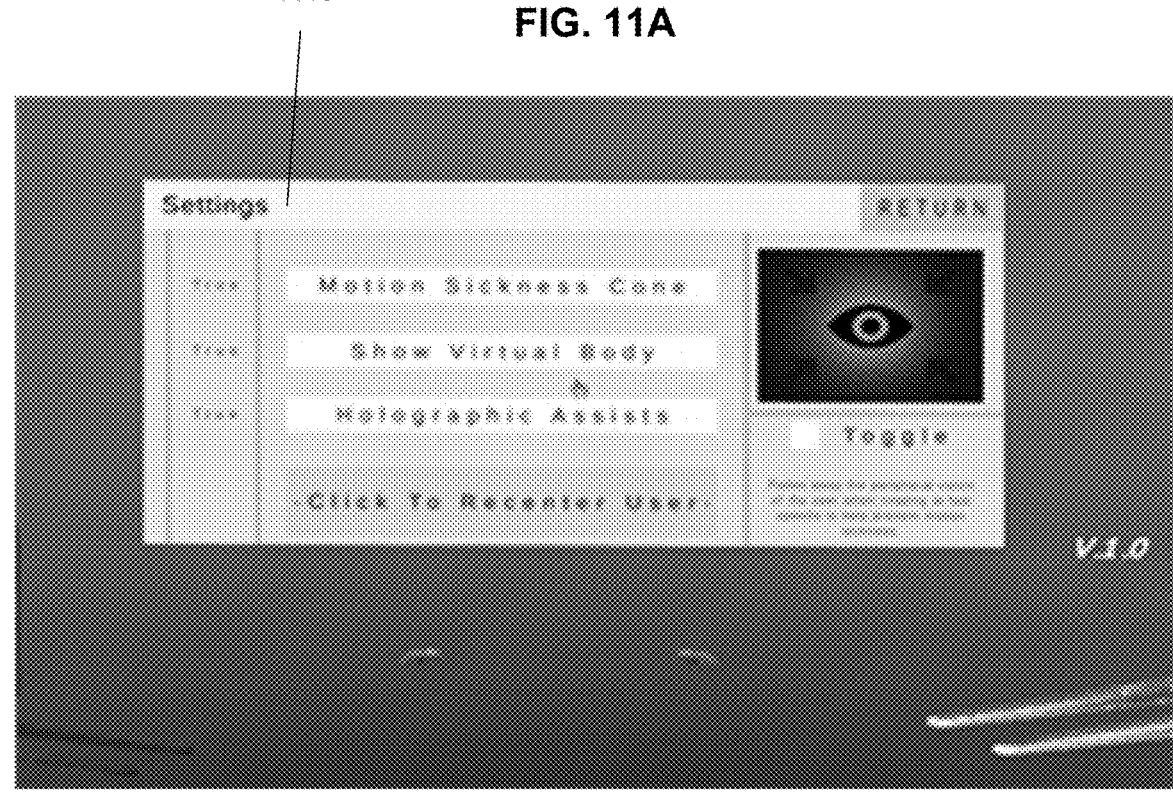
FIG. 11B is an example of a settings menu.

As illustrated in FIGS. 11A-11B, the virtual reality forklift simulator may have a menu 1100. The menu may include one or more tiles. In one example, the menu may include a start training tile 1102, a settings tile 1104, an about tile 1106, and a quit tile 1108. The start training tile 1102 may be pressed by a user to enter the virtual reality environment. The settings tile 1104 may take the user to the settings page

1110 when clicked. The settings page 1110 may include one or more settings options. In an example, the settings options may include a motion sickness cone toggle, a detailed view of the virtual body of the virtual reality forklift, holographic assists (e.g., guidance panels and guidance assist systems), and calibration settings. In an example, the about tile 1106 may explain the physics simulation of the virtual reality forklift simulator and provide information on training to become a forklift operator. The quit tile 1108 may be pressed to shut down the virtual reality simulator.

In some aspects, the user may select the start training tile 1102, settings tile 1104, about tile 1106, and/or quit tile 1108 by moving the right hand controller 2100 or the left hand controller 2102 over the desired tile and clicking the first selector button 2108 of the right hand controller 2100 or the first selector button 2120 of the left hand controller 2102. Similarly, the user may toggle settings moving the right hand controller 2100 or the left hand controller 2102 over the desired setting and clicking the first selector button 2108 of the right hand controller 2100 or the first selector button 2120 of the left hand controller 2102. The user may back out of a desired screen and go back to the previous screen by clicking the second selector button 2110 of the right hand controller 2100 or the second selector button 2122 of the left hand controller 2102.

Figure 12A:
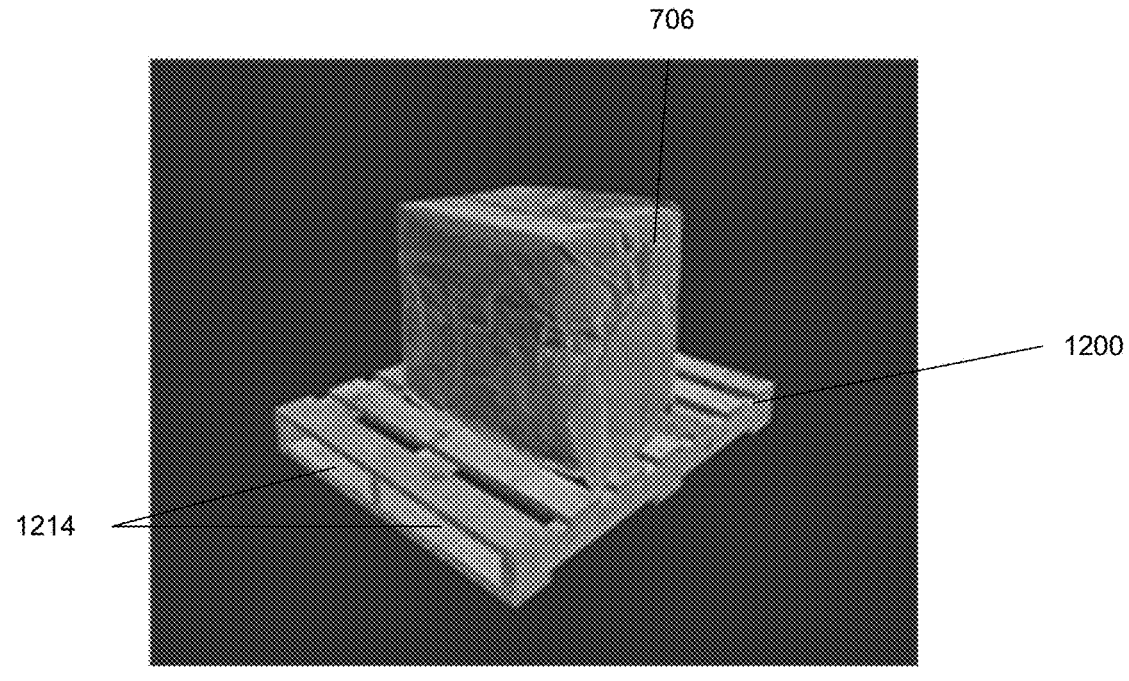
FIG. 12A is an example of a pallet and a crate.
Figure 12B:
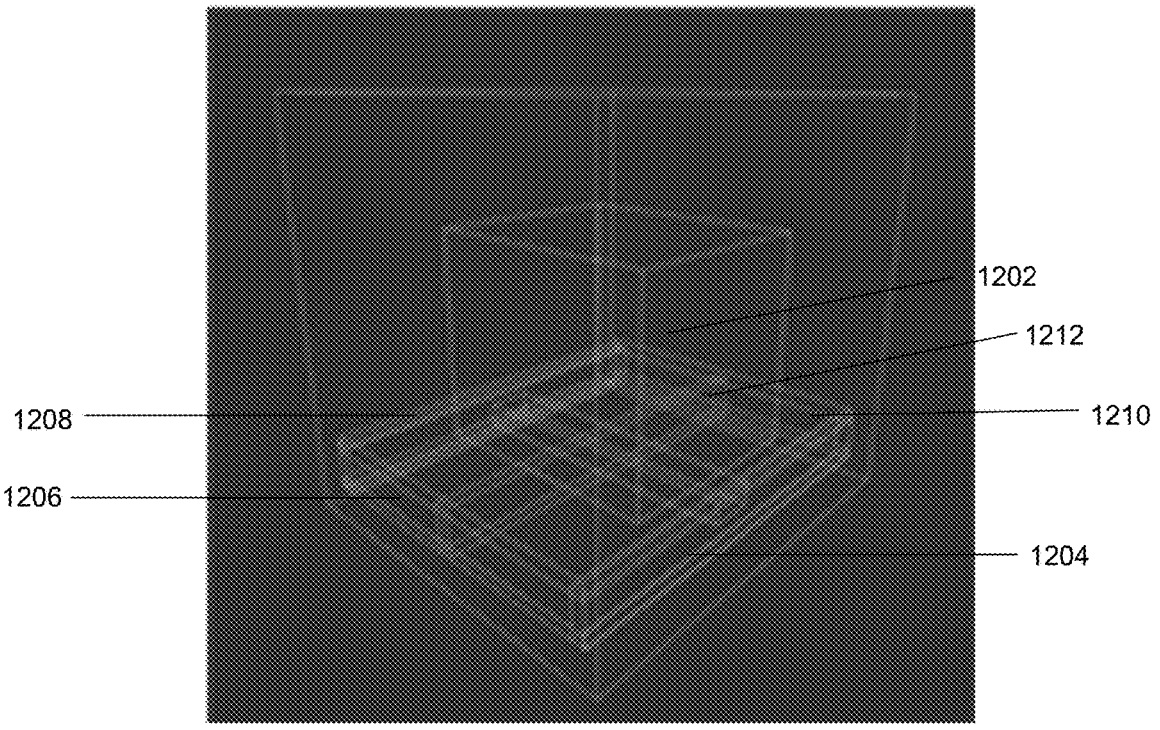
FIG. 12B is an example of an underlying physics system of a pallet and a crate.

FIG. 12A shows a crate 706 and a pallet 1200 in the virtual reality environment. The crate 706 may be simulated to have a weight. In some examples, the virtual reality crate may have a randomized simulated weight to add difficulty to the virtual reality forklift simulator. The pallet 1200 may have a set of slots 1214 configured such that the tynes 102 can be inserted in the set of slots 1214 of the pallet 1200. When the crate 706 is lifted by the tynes 102 and the mast 114, the center of mass 306 of the virtual reality forklift 100 shifts, simulating real world physics. As illustrated in FIG. 12B, the crate 706 may have a box collider 1202. The pallet 1200 may have multiple box colliders to simulate a real world pallet. The pallet 1200 may have four box colliders 1204, 1206, 1208, 1210 surrounding the outside of the pallet 1200 and one box collider 1212 through the middle of the pallet 1200.

In some aspects, the tynes 102 are configured to be inserted into the set of slots 1214 of the pallet 1200. The tynes 102 may then be raised by the mast 114 thereby raising the pallet 1200 and the crate 706. When the mast 114 raises the tynes 102, pallet 1200, and crate 706 off the floor and out of the vicinity of any obstacles, the pallet 1200 and the crate 706 may change simulation states and parent the pallet 1200 to the tynes 102 in a way that reduces simulation errors. When the pallet 1200 is parented to the tynes 102, the center of mass 306 of the virtual reality forklift 100 is adjusted to account for the weight of the pallet 1200 and the crate 706 and the height of the tynes 102. The adjustment of the center of mass 306 of the virtual reality forklift 100 may potentially destabilize the virtual reality forklift 100 if the center of mass 306 exceeds the safety triangle of the three point suspension system. While the pallet 1200 and the crate 706 are being held by the virtual reality forklift 100, the pallet 1200 and the crate 706 are still independently simulated such that sudden movements (e.g., sudden accelerations or braking), hitting environment geometry, and other events can knock the pallet 1200 and/or the crate 706 out of place and cause disruptions.

Figure 13A:
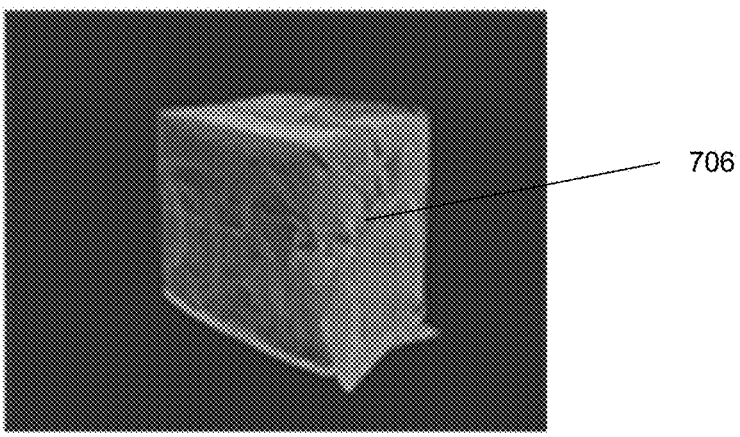
FIGS. 13A-13C are examples of crates.
Figure 13B:
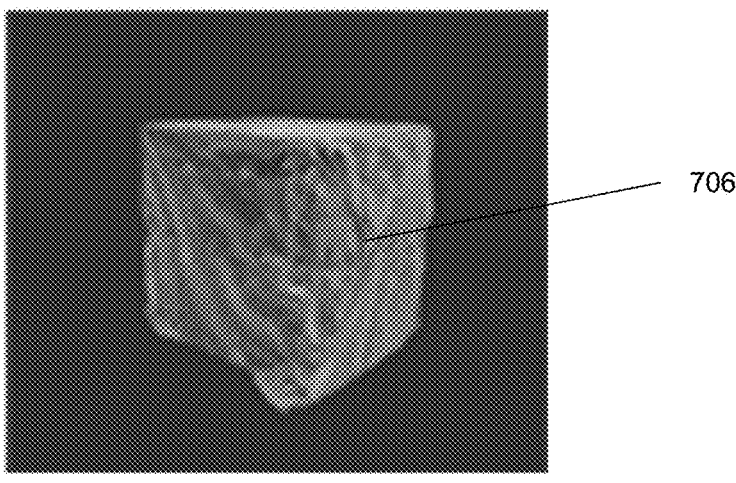
Figure 13C:
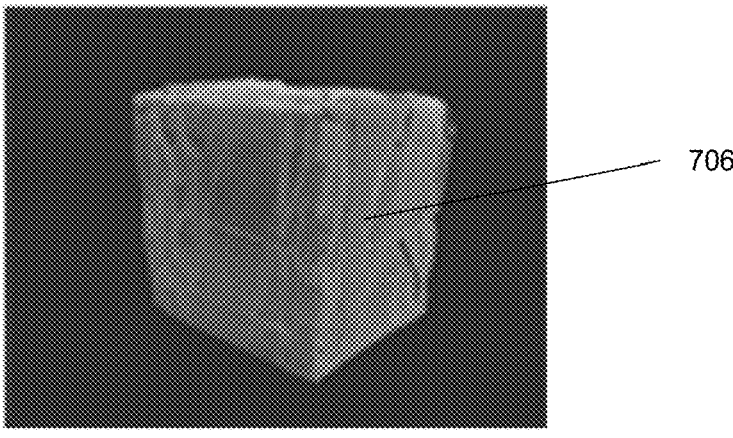

FIGS. 13A-13C illustrate further examples of a crate 706. The three different crates 706 may have different ranges of random weights, thereby changing the way the user needs to handle them.

Figure 14:
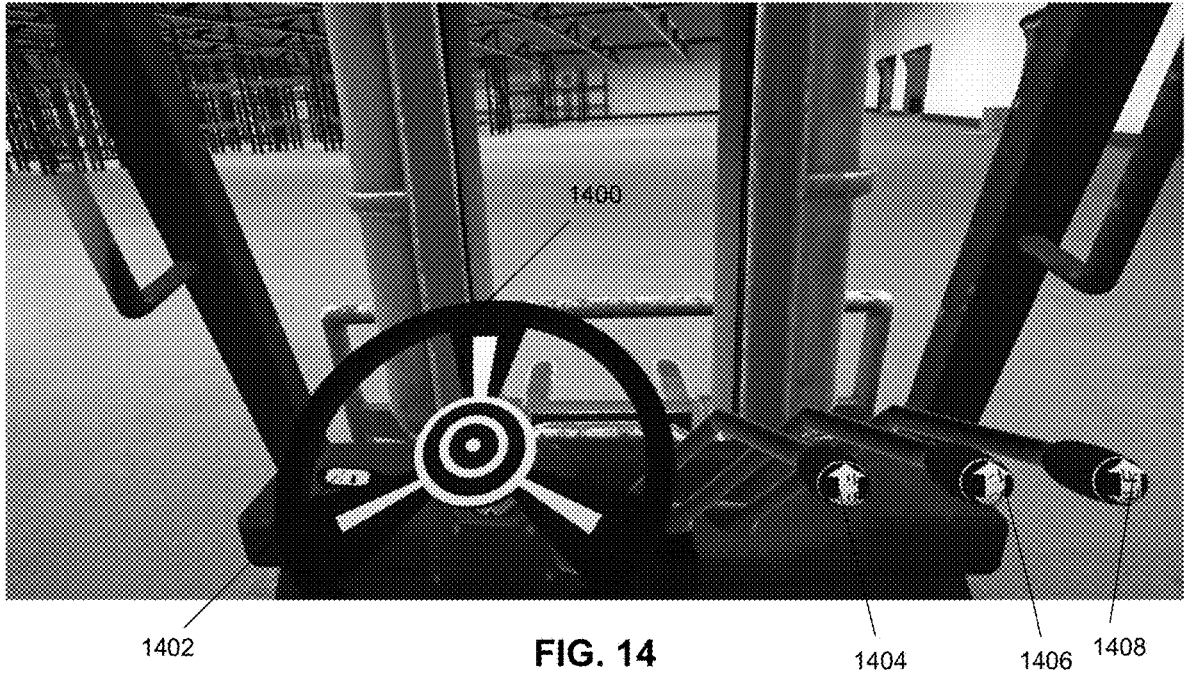
FIG. 14 is an example of a virtual reality forklift control system.

As illustrated in FIG. 14, the virtual reality forklift 100 may have three control levers, a steering wheel 1400, and a shift lever 1402. In some examples, the three control levers may be a first control lever 1404, a second control lever 1406, and a third control lever 1408. The first control lever 1404 may be operable to control the mast to move the tynes up and down. The second control lever 1406 may be operable to rotate the tynes at an angle at an incline or decline along an axis perpendicular to the face of the mast. The third control lever 1408 may be operable to rotate the tynes left or right along an axis parallel to the face of the mast. The shift lever 1402 may be configured to have three gears (e.g., a forward gear, a neutral gear, and a reverse gear). The steering wheel 1400 may be operable to turn the virtual reality forklift left or right when virtual reality forklift is moving.

In some aspects, the first control lever 1404 may be operable to move the tynes 102 up and down the mast 114 (e.g., to different heights). The first control lever 1404 may be programmed on its own script. The script for the first control lever 1404 may allow the processor to read an offset of the first control lever and move the tynes 102 on the mast 114 at a corresponding rate in an upward or downward direction. As illustrated in FIG. 14, the first control lever 1404 may move forward or backward. The script may program the movement of the first control lever 1404 on a first control lever axis. A positive value on the first control lever axis may correspond to pushing the first control lever 1404 forward which raises the tynes 102 on the mast 114. A negative value on the first control lever axis may correspond to pulling the first control lever backward which lowers the tynes on the mast 114. The first control lever axis may have a neutral position (e.g., a position where the first control lever 1404 sits when no force is applied). The neutral position may hold the tynes 102 at their current height. The farther a user pushes the first control lever forward (e.g., by grasping the first control lever with the grip button 2104, 2116 of the right hand controller 2100 or the left hand controller 2102 and moving the right hand controller 2100 or the left hand controller 2102 forward) the faster the tynes 102 raise on the mast 114. If a user raises the tynes 102 too quickly, the virtual reality forklift 100 may be destabilized. The farther a user pulls the first control lever 1404 backward (e.g., by grasping the first control lever 1404 with the grip button 2104, 2116 of the right hand controller 2100 or the left hand controller 2102 and moving the right hand controller 2100 or left hand controller 2102 backward) the faster the tynes 102 lower on the mast 114. If a user lowers the tynes 102 too quickly, the virtual reality forklift 100 may be destabilized.

In an aspect, the second control lever 1406 may be operable to rotate the tynes 102 at an incline or decline in relation to the mast 114. The second control lever 1406 may be programmed to run on its own script. The script for the second control lever 1406 may allow the processor to read an offset of the second control lever 1406 and rotate the tynes 102 on the mast 114 at a corresponding rate to the offset in an incline or decline in relation to the mast 114. As illustrated in FIG. 14, the second control lever 1406 may move forward or backward. The script may program the movement of the second control lever 1406 on a second control lever axis. When the second control lever is at a neutral position (e.g., a zero position) the tynes 102 remain in their current inclined, declined, or perpendicular to the mast position. A positive value on the second control lever axis may correspond to pushing the second control lever forward which rotates the tynes 102 in a direction inclining from the mast 114 (e.g., decreasing the angle between the tynes 102 and the upper portion of the mast 114). A negative value on the second control lever axis may correspond to pulling the second control lever 1406 backward which rotates the tynes 102 in a direction declining from the mast 114 (e.g., increasing the angle between the tynes 102 and the upper portion of the mast). The farther a user pushes the second control lever 1406 forward (e.g., by grasping the second control lever 1406 with the grip button 2104, 2116 of the right hand controller 2100 or the left hand controller 2102 and moving the right hand controller 2100 or left hand controller 2102 forward) the faster the tynes 102 move in an inclining direction from the mast 114. If the user rotates the tynes 102 in the inclining direction too quickly, the virtual reality forklift 100 may be destabilized. The farther a user pulls the second control lever 1406 backward (e.g., by grasping the second control lever 1406 with the grip button 2104, 2116 of the right hand controller 2100 or the left hand controller 2102 and moving the right hand controller 2100 or left hand controller 2102 backward) the faster the tynes 102 rotate in a declining direction in relation to the mast 114. If a user rotates the tynes 102 to a decline in relation to the mast 114 too quickly, the virtual reality forklift 100 may be destabilized.

In an aspect, the third control lever 1408 may be operable to rotate the tynes 102 left or right in relation to the mast 114. The third control lever 1408 may be programmed to run on its own script. The script for the third control lever 1408 may allow the processor to read an offset of the third control lever 1408 and rotate the tynes 102 on the mast 114 at a corresponding rate to the offset in a left or right direction. As illustrated in FIG. 14, the third control lever 1408 may move forward or backward. The script may program the movement of the third control lever 1408 on a third control lever axis. A positive value on the third control lever axis may correspond to pushing the third control lever forward which rotates the tynes 102 in a direction to the right in relation to the mast 114. A negative value on the third control lever axis may correspond to pulling the third control lever 1408 backward which rotates the tynes in a direction to the left in relation to the mast 114. A neutral position on the third control lever axis (e.g., the position when no force is applied to the third control lever 1408) will maintain the current positioning of the tynes 102. The farther a user pushes the third control lever 1408 forward (e.g., by grasping the third control lever 1408 with the grip button 2104, 2116 of the right hand controller 2100 or the left hand controller 2102 and moving the right hand controller 2100 or left hand controller 2102 forward) the faster the tynes 102 rotate in a rightward direction in relation to the mast 114. If the user rotates the tynes 102 in the rightward direction too quickly, the virtual reality forklift 100 may be destabilized. The father a user pulls the third control lever 1408 backward (e.g., by grasping the third control lever 1408 with the grip button 2104, 2116 of the right hand controller 2100 or the left hand controller 2102 and moving the right hand controller 2100 or left hand controller 2102 backward) the faster the tynes 102 rotate in a leftward direction in relation to the mast 114. If a user rotates the tynes 102 left in relation to the mast 114 too quickly, the virtual reality forklift may be destabilized.

In another aspect, the steering wheel 1400 may be operable to turn the front two wheels of the virtual reality forklift 100 in order to steer the virtual reality forklift 100. The steering wheel 1400 may be programmed to run on its own script. A user may use the grip button 2104 of the right hand controller 2100 or the grip button 2116 of the left hand controller 2102 to grip the steering wheel. An invisible trigger collider may be parented to each of the user's hands (e.g., to the right hand controller 2100 and the left hand controller 2102). Once the user has grasped the steering wheel 1400, the user may turn the steering wheel 1400. The script will determine the offset between the initial position of the user's hand that grabbed the steering wheel 1400 and the current position of the user's hand. The offset will then determine how far the wheels move to turn the virtual reality forklift 100.

As illustrated in FIG. 14, the shift lever 1402 may be operable to determine the direction of motion of the virtual reality forklift 100. The shift lever 1402 may have three positions, a forward position, a neutral position, and a reverse position. The shift lever 1402 may start in the neutral position when the forklift is turned off. To drive the virtual reality forklift 100 forward, a user may place the shift lever 1402 in the forward position by hovering the right hand controller 2100 or left hand controller 2102 over the shift lever 1402, grasping the shift lever 1402 using the grip button 2104 of the right hand controller 2100 or the grip button 2116 of the left hand controller 2102, and pushing the shift lever 1402 forward by moving the right hand controller 2100 or left hand controller 2102 forward. To drive the virtual reality forklift 100 backward, the user may place the shift lever 1402 in the backward position by hovering the right hand controller 2100 or the left hand controller 2102 over the shift lever 1402, grasping the shift lever 1402 by pressing and holding the grip button 2104 of the right hand controller 2100 or the grip button 2116 of the left hand controller 2102, and moving the right hand controller 2100 or the left hand controller backwards.

Figure 15:
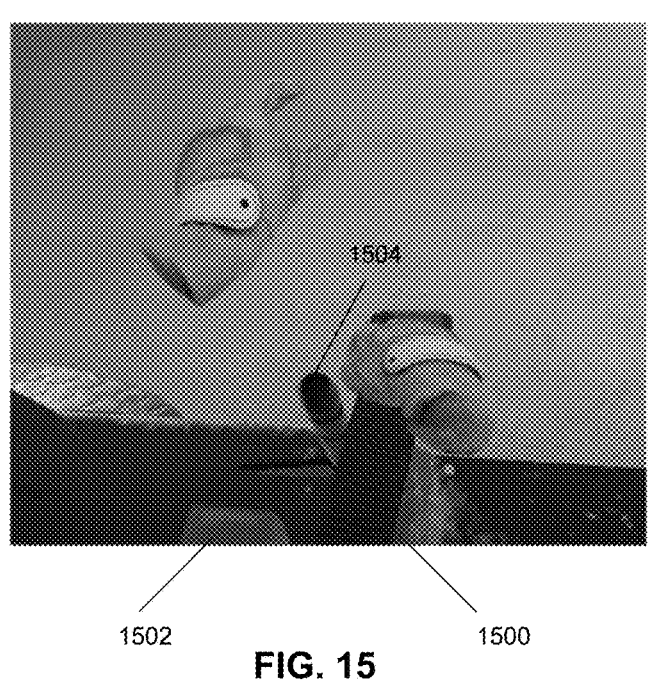
FIG. 15 is an example of a virtual reality forklift.

As illustrated in FIG. 15, the virtual reality forklift may have a lap belt restraint 1500, a safety belt clip 1502, and an emergency brake lever 1504. The lap belt restraint 1500 may be operable to be secured over a virtual reality user by securing the end of the lap belt restraint (e.g., the buckle) to the safety belt clip 1502. The emergency brake lever 1504 may have two positions (e.g., an emergency brake engaged position and an emergency brake disengaged position). When the emergency brake is engaged, the virtual reality forklift will not be able to move. When the emergency brake is disengaged, the virtual reality forklift will be able to move.

In some aspects, a user may secure the lap belt restraint 1500 by hovering the right hand controller 2100 over the lap belt restraint 1500, holding down the grip button 2104 of the right hand controller 2100 to grasp the lap belt restraint 1500, moving the right hand controller 2100 while grasping the lap belt restraint 1500 to the safety belt clip 1502, and releasing the grip button 2104 of the right hand controller 2100. The virtual reality forklift simulator may be programmed such that when the end (e.g., buckle) of the lap belt restraint 1500 enters a zone surrounding the safety belt clip 1502, the buckle is programed to automatically click into the safety belt clip. The lap belt restraint 1500 may be secured in the same manner using the left hand controller 2102.

In an aspect, the emergency brake may be engaged by hovering the right hand controller 2100 over the emergency brake lever 1504, pressing and holding the grip button 2104 of the right hand controller 2100, moving the right hand controller 2100 holding the emergency brake lever 1504 to the engaged position (e.g., forward position). To disengage the emergency brake, a user may hover the right hand controller 2100 over the emergency brake lever 1504, press and hold the grip button 2104 of the right hand controller 2100, and move the right hand controller 2100 holding the emergency brake lever 1504 to the disengaged position (e.g., back position). In another example, the emergency brake may be engaged by hovering the left hand controller 2102 over the emergency brake lever 1504, pressing and holding the grip button 2116 of the left hand controller 2102, moving the left hand controller 2102 holding the emergency brake lever 1504 to the engaged position (e.g., forward position). To disengage the emergency brake, a user may hover the left hand controller 2102 over the emergency brake lever 1504, press and hold the grip button 2116 of the left hand controller 2102, and move the right hand controller 2100 holding the emergency brake lever 1504 to the disengaged position (e.g., back position). The emergency brake lever 1504 may be programmed on its own script. The script of the emergency brake lever 1504 may put the emergency brake lever 1504 on an emergency brake lever axis. The emergency brake lever axis may have two positions, a forward position and a backward position, for engaging or disengaging the emergency brake.

In an aspect, the virtual reality forklift 100 may have a key and an ignition slot. A user may turn the virtual reality forklift on by locating the key using the headset to look for the key, grasping the key by pressing and holding the grip button 2104 of the right hand controller 2100 or pressing and holding the grip button 2116 of the left hand controller 2102, inserting the key into the ignition slot by moving the right hand controller 2100 or left hand controller 2102 near the ignition slot, and turning the key by rotating the right hand controller 2100 or the left hand controller 2102. In some examples, the ignition slot may have a zone around it. When the key enters the zone of the ignition slot, the virtual reality forklift simulator may be programmed to automatically insert the key into the ignition slot.

Figure 16:
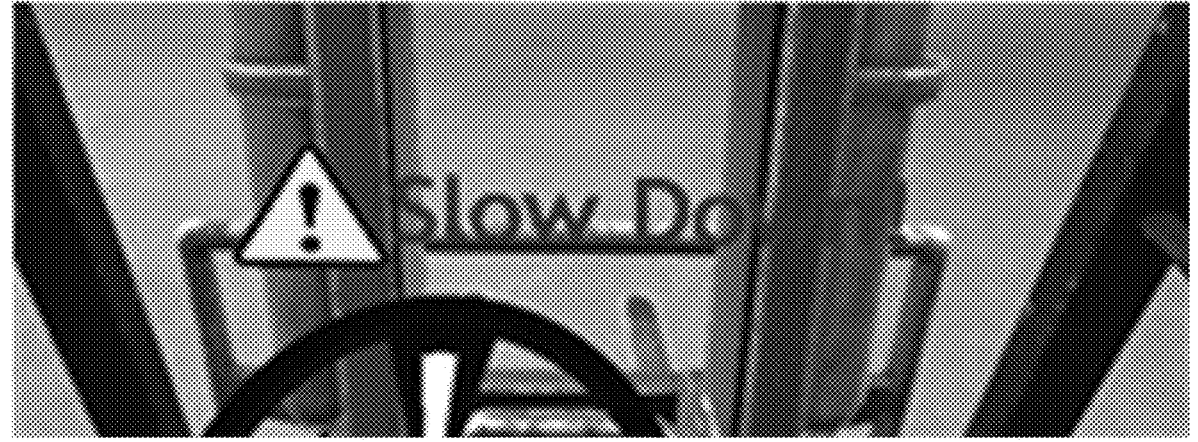
FIG. 16 is an example of a warning.
Figure 17:
FIG. 17 is an example of a warning.

As illustrated in FIGS. 16 and 17, the virtual reality forklift simulator may provide warnings to a user. As illustrated in FIG. 16, a warning may be given to a user when the virtual reality forklift 100 is moving too fast. As illustrated in FIG. 17, the virtual reality forklift simulator may be halted when the user is operating the virtual reality forklift in an unsafe condition. In other examples, warnings may be given for other unsafe conditions, such as a tipping warning (e.g., when cargo has been picked up with the tynes over a threshold height or when the virtual reality forklift is moving on uneven ground in an unsafe manner), collision warning (e.g., when the virtual reality forklift has run into an object in the virtual reality environment), an excessive speed warning, a mishandling of cargo warning, a damaged cargo warning, or a dropped cargo warning (e.g., when the user drops the cargo off the tynes from an unsafe height).

Figure 18:
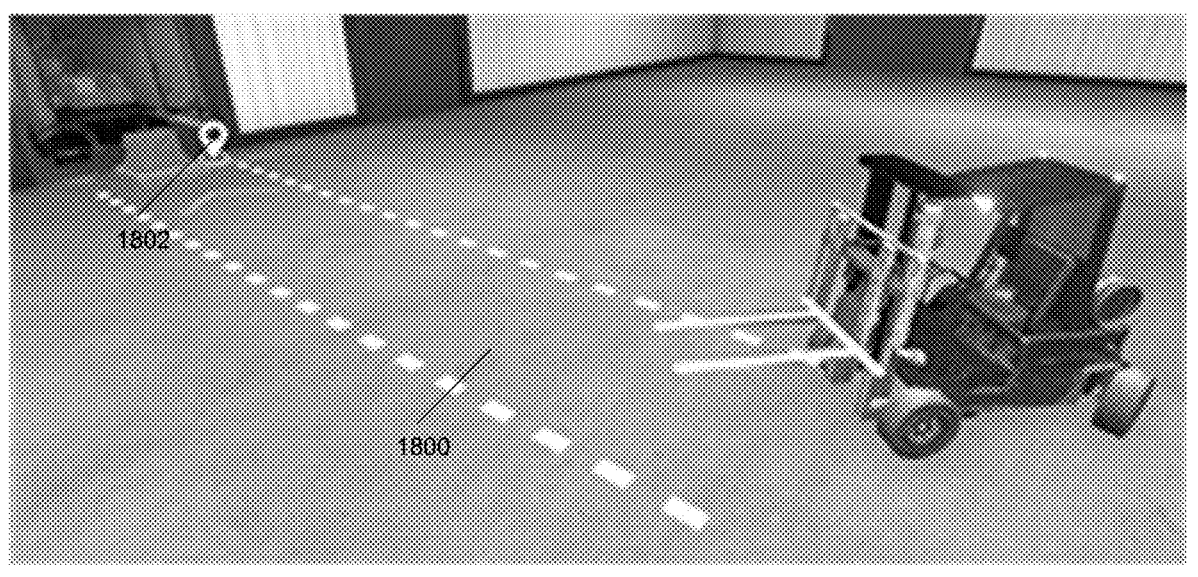
FIG. 18 is an example of an assist overlay.
Figure 19:
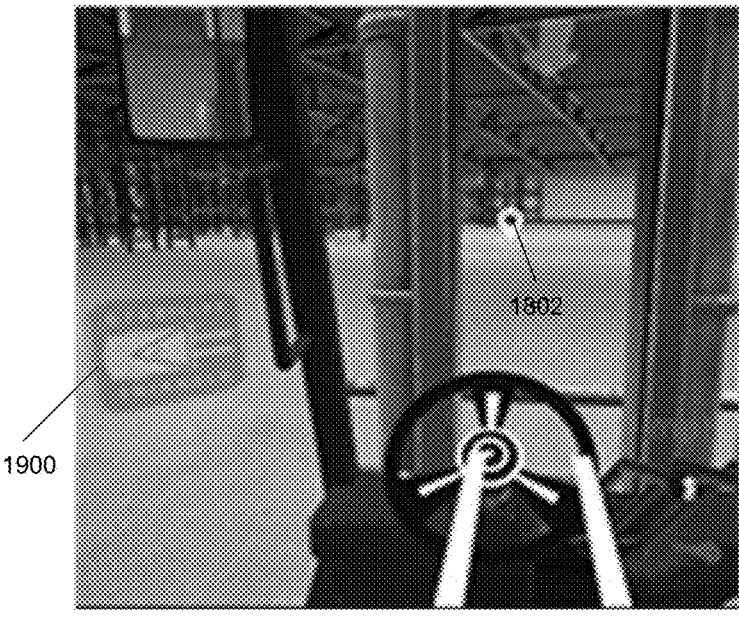
FIG. 19 is an example of an assist overlay.

As illustrated in FIGS. 18 and 19, the virtual reality forklift simulator may have an assist overlay. In some examples, the assist overlay may provide an arrow 1800 pointing towards an object or objective. In other examples, the assist overlay may be a safety triangle indicator 1900 showing a user the level of danger to stability in the virtual reality forklift's current state. In a further example, the assist overlay may provide a marker 1802 showing a user where to drive the virtual reality forklift. In another example, the assist overlay may be a highlight of the slots of a pallet to be picked up by the tynes. In some examples, the assist overlay may highlight or point an arrow towards certain controls to be used (e.g., first, second, and third control lever, drive shift lever, emergency brake lever, etc.). At any moment during use of the virtual reality simulator, the one or more assist overlays may be toggled on or off by the user.

In an aspect, the safety triangle may determine whether the virtual reality forklift is tipping (i.e., tilting) or about to tip. The safety triangle indicator 1900 may be programmed to provide a user with a measure of the virtual reality forklift's stability. The safety triangle may be programmed to take into account various factors affecting the virtual reality forklift's stability. The safety triangle may depend on forces provided by objects and the virtual reality environment. For example, the safety triangle may take into account the center of mass of the virtual reality forklift and the center of mass of a crate loaded onto the tynes of the virtual reality forklift. The center of mass of the virtual reality forklift may be programmed to be constantly changing, therefore changing the status of the safety triangle, due to different movements and inputs provided by the user or forces provided by the virtual reality environment. In one example, the safety triangle may be programmed such that when the tynes are moved up or down or rotated horizontally or vertically the center of mass of the virtual reality forklift may change. When the center of mass of the virtual reality forklift is moved left or right due to the loading of a crate, sloped ground of the virtual reality environment, or other forces (e.g., collisions with objects in the virtual reality environment), the virtual reality forklift may tilt in the direction its center of mass has moved. The safety triangle indicator 1900 may alert the user when the virtual reality forklift is tilting such that the user gains training in how to safely operate a forklift in a real-world environment. The virtual reality forklift may also tilt forward or backward depending on the weight of cargo being held on the tynes. The center of mass of the virtual reality forklift may be constantly changing depending on various parameters such as the weight of the cargo, the height of the tynes, the speed of the virtual reality forklift, or the virtual reality environment in which the virtual reality forklift operates (e.g., the slope of the ground, etc.). When the tynes do not have a cargo loaded on them, the center of mass of the virtual reality forklift may not shift or only shift slightly due to movement of the tynes.

In some aspects, the status of the safety triangle may depend on the amount of force exerted on the wheels of the virtual reality forklift. The force exerted on the wheels may depend on the location of the center of mass of the virtual reality forklift. Each wheel may be programmed to react to the positioning of the center of mass of the virtual reality forklift independently. For example, when the center of mass of the virtual reality forklift is closer to the front left wheel, the front left wheel will have the highest force exerted on it. The center of mass may be closest to the front left wheel when, for example, the tynes are carrying a piece of cargo at a height and the cargo is rotated towards the left front wheel with respect to the mass. In this example, if the force on the front left wheel exceeds the support threshold of the front left wheel, the safety triangle will be exceeded resulting in the forklift tilting towards the front left wheel. It will be appreciated that the virtual reality forklift is similarly simulated in all other directions, therefore a similar tilt could occur in any direction if the support of one or more wheels is exceeded by the force provided to them by the center of mass of the virtual reality forklift. For example, if a heavy piece of cargo is raised too high on the virtual reality forklift and/or too abrupt a braking force is input to the virtual reality forklift simulator the virtual reality forklift may tilt/fall forward because the force on the front two wheels exceeds the safety triangle. The safety triangle may be exceeded due to a combination of an acceleration input by a user and a force exerted on the one or more wheels by the center of mass of the virtual reality forklift. The virtual reality forklift may be simulated such that it reacts in the same way a real world forklift reacts to various forces and accelerations.

Figure 20:
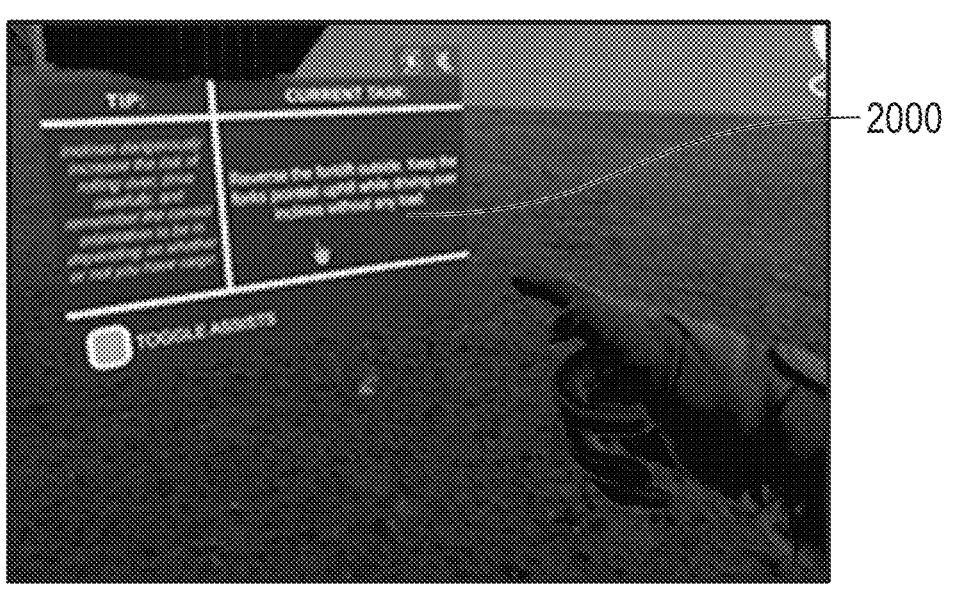
FIG. 20 is an example of a guidance panel.

As illustrated in FIG. 20, the virtual reality forklift simulator may further include a guidance tablet 2000 describing to a user an objective to be completed. In further examples, audio may describe to the user an objective to be completed. The guidance tablet 2000 may guide the user through various objectives to accommodate for many learning styles and prevent any confusion. When given a prompt for a new objective, an audio narration will play to the user, describing in detail what task is next, as well as providing reminders when necessary. The guidance tablet 2000 may further include tips (e.g., detailed instructions) for the current objective. In some examples, the user may mute the audio dialogue or replay the last spoken piece of dialogue.

Further disclosed herein is a method for training a user in forklift operation. The method may include training the user using the virtual reality forklift simulator based on the physics simulations disclosed herein. At a first step, the method may include booting up the virtual reality forklift simulator having a virtual reality environment. The virtual reality forklift simulator may be programmed on a computing system and have a processor. The virtual reality forklift simulator may have a right hand controller, left hand controller, and headset. The headset may allow the user to enter into the virtual reality environment. The right hand controller and left hand controller may allow the user to interact with the virtual reality environment.

Booting up the virtual reality forklift simulator may comprise one or more steps. The virtual reality forklift simulator may be booted up by turning on the computing system (e.g., CPU) and selecting the virtual reality forklift simulator from a menu of applications. The user or an instructor may select settings for the virtual reality forklift simulator. In some examples, the user may use one or more selector buttons on the right hand controller or the left hand controller to select settings. In an example, the settings may include a motion sickness cone, holographic assists, and calibration settings. The user may begin operating the virtual reality forklift by selecting a start training tile.

At a second step, the method may include instructing the user to complete one or more objectives using the virtual reality forklift. In some examples, the user may complete the one or more objectives by providing inputs using the right hand controller, the left hand controller, and the headset. In an example, the instructions may be provided to the user via audio and visual instructions. An audio recording may provide the user with detailed instructions for completing one or more objectives. Visual instructions may be provided to the user in the form of a guidance tablet describing the one or more objectives.

At a third step, the method may include completing one or more objectives using the hand controllers to manipulate the virtual reality environment. At a fourth step, the method may include providing guidance and/or warnings to the user based on the user's performance in the virtual reality forklift and the virtual reality environment.

In some aspects, the one or more objectives may include locating various components of the virtual reality forklift, securing safety equipment, scanning the virtual reality environment for obstacles, driving the virtual reality forklift, and picking up and moving cargo using the virtual reality forklift. In some examples, the virtual reality forklift may have a key, an ignition slot, a steering wheel, an emergency brake, a steering wheel, a first control lever, a second control lever, a third control lever, a set of tynes, and a mast. The virtual reality forklift may be simulated using collider boxes on the tynes, the body of the virtual reality forklift, and the mast, such that the tynes, body, and mast react with the virtual reality environment using real world physics. The wheels of the virtual reality forklift may be simulated using circle colliders. The wheels may provide a friction force with the ground when given an input from an accelerator trigger on the right hand controller. The wheels may be provided a friction force when given an input from a brake trigger on the left hand controller.

In an aspect, the virtual reality forklift may have a three point suspension system simulated using three or more wheel colliders, such that the virtual reality forklift reacts to forces in the same way a real world forklift would react to forces. In some examples, the forces may include a force from colliding with an object in the virtual reality environment, a force from lifting and/or lowering cargo, a force from accelerating or braking, and gravity. The three point suspension system may be configured such that a safety triangle is created. The safety triangle may allow the user to train to safely operate a forklift by taking into account various forces provided to the virtual reality forklift in the virtual reality environment.

In various aspects, the cargo may be crates and pallets. The crates may be simulated to have randomized weights. In some examples, the virtual reality forklift simulator may have three different types of crates having various ranges of randomized weights to increase the difficulty and variability of the training. The crates and pallets may be simulated using box colliders, such that the crates and pallets react to forces in the same way real world crates and pallets react to forces.

In an aspect, the one or more objectives may include a series of objectives. The user may be required to complete the series of objectives safely without receiving an unsafe condition warning. The first objective may include securing a lap belt restraint over the user's lap. The user may grasp the lap belt restraint by hovering either hand controller over the lap belt restraint, grasping the lap belt restraint by pressing and holding the grip button of the hand controller, and moving the hand controller, and thereby the lap belt restraint, over the user's lap and into a zone. Once the lap belt restraint enters the zone, the buckle of the lap belt restraint may automatically connect to a lap belt restraint clip.

A second objective may include locating various controls of the virtual reality forklift. The user may be instructed to look around the virtual reality forklift using the headset to locate the emergency brake, the shift lever (for shifting the virtual reality forklift into a forward gear, neutral, and a reverse gear), a key, an ignition slot, a first control lever (for raising or lowering the tynes using the mast), a second control lever (for rotating the tynes to an inclined or declined position in relation to the mast), and a third control lever (for rotating the tynes in a horizontal, left or right, direction in relation to the mast).

A third objective may include ensuring the shift lever is in the neutral position. The user may grasp the shift lever using the grip button on either controller and check the three shift lever positions. The user may then ensure the shift lever is in the neutral position by putting the shift lever in the middle position. In some examples, the shift lever may be programed to result in different positions based on a shift lever axis. The shift lever axis may include three positions for the shift lever. The forward position may correspond to a forward gear (e.g., when an acceleration is provided via the acceleration trigger the virtual reality forklift will move forward). The neutral position may correspond to putting the virtual reality forklift in neutral (e.g., when an acceleration is provided via the acceleration trigger the wheels of the virtual reality forklift will not provide a friction force to the ground of the virtual reality environment). The reverse position may correspond to putting the virtual reality forklift in a reverse gear (e.g., when an acceleration is provided via the acceleration trigger the virtual reality forklift will more backwards or in reverse).

A fourth objective may include locating and engaging an emergency brake. The user may locate the emergency brake by looking around the virtual reality forklift using the headset. The user may engage the emergency brake by grasping the emergency brake lever using the grip button on either hand controller and moving the hand controller forward thereby moving the emergency brake lever to a forward (i.e., engaged) position.

A fifth objective may include turning on the virtual reality forklift. The virtual reality forklift may be turned on by locating a virtual reality forklift key using the headset to look around the virtual reality forklift, grasping the key using the grip button on either hand controller, inserting the key in an ignition slot by moving the hand controller grasping the key to the ignition slot, and turning the key in the ignition slot. The key may be programmed to be automatically inserted in the ignition slot when the key enters a zone around the ignition slot.

A sixth objective may include moving the set of tynes up and down on the mast. In some examples, the tynes may be connected to the mast using a programmed spring joint, such that the tynes react to forces from an input to the mast in the same way a real world set of tynes and mast interact. In an example, the user may raise or lower the tynes by using a first control lever operable to be moved forward from a neutral position and backward from a neutral position. The user may raise the tynes by grasping the first control lever using the grip button on either hand controller and moving the hand controller forward. The amount of movement forward by the hand controller may determine the amount of offset (e.g., from the neutral position to the new forward position) of the first control lever. The offset may determine the speed the tynes raise. The user may lower the tynes by grasping the first control lever using the grip button on either hand controller and pulling the first control lever backwards (e.g., a position closer to the user than the neutral position). The offset between the neutral position and the backward pull of the user may determine the speed with which the tynes are lowered.

A seventh objective may include engaging a brake and disengaging the emergency brake. The user may engage the brake by holding a trigger of the left hand controller. The user may disengage the emergency brake by grasping the emergency break lever using the grip button on either hand controller and moving the emergency brake lever to a backward (i.e., disengaged) position.

An eighth objective may include checking for one or more pedestrians around the virtual reality forklift within a safety range. In some examples, the safety range may extend about 10 meters around the virtual reality forklift in all directions. The user may check for pedestrians by looking in all directions of the virtual reality forklift using the headset.

A ninth objective may include shifting the virtual reality forklift into a forward gear using the shift lever. The user may shift the virtual reality forklift into the forward gear by grasping the shift lever using the grip button on either hand controller and moving the hand controller forward until the shift lever clicks into the forward gear. In some examples, the shift lever may click into the forward gear when the shift lever is moved to a zone (e.g., a programmed zone).

A tenth objective may include driving to a first marked location. The user may drive to the first marked location by providing an acceleration to the wheels of the virtual reality forklift using the trigger (i.e., acceleration trigger) of the right hand controller. The wheels of the virtual reality forklift may provide a friction force to the ground of the virtual reality corresponding the amount of force provided to the acceleration trigger. The friction force, in combination with other real life factors (e.g., inertia, etc.), may determine the speed of the virtual reality forklift. If the virtual reality forklift exceeds a safety speed threshold, a visual and/or audible warning may be provided to the user. If the user exceeds a maximum safety speed threshold, the virtual reality forklift simulator may halt and require the user to restart the virtual reality forklift simulator. The user may steer (e.g., turn) the virtual reality forklift towards the first marked location. The user may use the steering wheel to steer the virtual reality forklift by grasping the steering wheel using the grip button of either hand controller and rotating the steering wheel in a desired direction by moving the hand controller. The steering wheel may move the wheels of the virtual reality forklift in an amount corresponding to an offset created between the position of the hand controller when the steering wheel was initially grasped and current (e.g., real time) location of the hand controller grasping the steering wheel. When the wheels of the virtual reality forklift are turned, the virtual reality forklift may change direction according to the input given to the steering wheel. If a user turns too quickly or in an otherwise dangerous manner, a warning may be displayed indicating that the user is operating the forklift in an unsafe condition. The unsafe condition may be a result of the forklift operating outside of the safety triangle. If the user exceeds a threshold of the safety triangle (e.g., in a manner where the forces on a real world forklift would cause it to tip or crash) the virtual reality may halt and require the user to restart the objective and/or read a prompt explaining the unsafe operation of the virtual reality forklift.

A twelfth objective may include picking up a first cargo. In some examples, the first cargo may be a pallet with a crate on top of the pallet. The crate may have a randomized weight. The user may pick up the first cargo by aligning the tynes with a set of slots in the pallet. The user may align the tynes and the set of slots by steering the forklift using the steering wheel. In some examples, when a user overshoots alignment, the user may have to shift the virtual reality forklift into the reverse gear using the shift lever. The user may also have to shift the forklift back into the forward gear using the shift lever. Since the virtual reality forklift similar allows the user to have freedom of movement to operate the forklift, the user may have to shift between forward gear and reverse gear multiple times to align the tynes with the set of slots. The user also may be required to raise or lower the tynes to the correct height to match the height of the slots of the pallet using the first control lever. Once the tynes are aligned with the slots, the user may insert the tynes into the slots by moving the virtual reality forklift forward. After the tynes are inserted in the slots of the pallet, the user may raise the cargo to a certain height to safely transport the cargo. After the cargo is raised to a safe height, the user may tilt the cargo using the second control lever to secure the cargo.

In some aspects, if the tynes are not aligned with the slots and the user moves the virtual reality forklift forward, the tynes may collide with the pallet, crate, or another object in the virtual reality environment causing disruptions. In some examples, the disruptions may include knocking the crate off the pallet, pushing the pallet and the crate into another object, causing damage to the crate, pallet or another object, or other disruptions that improperly operating a real world forklift would cause. When a disruption occurs, a warning may be provided to the user via the headset. If the disruption is of a certain level of danger, the virtual reality forklift simulator may halt, explain to the user the unsafe or dangerous condition the user created, and require the user to restart the objective or restart from the beginning of the training.

A thirteenth objective may include driving the cargo to a second marked location in the virtual reality environment. The user may use the acceleration trigger, brake trigger, and steering wheel to drive the virtual reality forklift loaded with the cargo to the second marked location. The cargo (e.g., pallet and first crate) may be independently simulated from the physics system of the virtual reality forklift, such that a user may learn how the cargo moves and reacts in a real world environment as well as a forklift moves and reacts in a real world environment. Since the crate has a randomized weight, each crate the user picks up and transports may react differently to different forces. The weight of the crate may also determine various physical reactions of the virtual reality forklift. Once the cargo is loaded, the cargo is reparented (i.e., programmed) to the tynes, increasing the weight of the virtual reality forklift as well as changing the center of mass of the virtual reality forklift. By changing the weight and the center of mass, the acceleration required to move the virtual reality forklift and the brake force needed to stop the virtual reality forklift may change, providing a real world simulation. This programming provides the user with the opportunity to operate the virtual reality forklift in different ways, allowing the training to be comprehensive. If the user operates the virtual reality forklift in an unsafe way (e.g., colliding with other objects in the virtual reality environment, allowing the cargo to slip off the tynes, or exceeding a speed limit), a warning may be provided to the user on the headset. If the user creates a dangerous condition, by damaging the cargo or the virtual reality forklift, the virtual reality simulator may halt and require the user to restart the objective or the entire training.

A fourteenth objective may include placing the cargo in the second marked location. Placing the cargo in the second marked location may require a user to drive to the second marked location, level the cargo with the ground using the second control lever, lower the cargo with the first control lever, and reverse away from the cargo to allow the tynes to remove themselves from the slots of the pallet. While placing the cargo, the cargo may be independently simulated such that the cargo may have various unsafe condition possibilities. In some examples, the unsafe conditions may be tilting the cargo too far at a downward angle such that the cargo may slide off the tynes before the cargo is fully lowered, colliding with other objects in the virtual reality environment, and/or lowering the cargo too fast such that the safety triangle of the virtual reality forklift is outside of a threshold and the virtual reality forklift becomes destabilized. If the user operates the forklift in an unsafe condition, a warning may be displayed describing the unsafe condition to the user. If the user creates a highly dangerous situation, the virtual reality forklift simulator may halt and require the user to restart the objective or restart the training from the beginning.

A fifteenth objective may include driving the virtual reality forklift to a third marked location. The user may drive the virtual reality forklift to the third marked location using the steering wheel, acceleration trigger, and brake trigger. The virtual reality forklift simulator may display various warnings as described herein if the user engages in unsafe operation of the virtual reality forklift. In some examples, the third marked location may be located outside of a warehouse and down a ramp. Driving down the ramp may require the user to train other skills, such as correcting the height of the tynes such that the tynes do not collide with the ground and driving under the force of gravity. The ramp may create another unique challenge for the user to accomplish.

A sixteenth objective may include loading a second piece of cargo (e.g., second pallet and second crate) on to the tynes of the virtual reality forklift. In some examples, the second crate may have a randomized weight that is different than the weight of the first crate. The user may use the steering wheel, acceleration trigger, brake trigger, and shift lever to orient the tynes with the slots of the second pallet. The user may then insert the tynes into the slots of the second pallet by driving forward and lift the second cargo using the first shift lever. The user may secure the second cargo by rotating the tynes in an inclined direction using the second shift lever. Picking up the second cargo and the potential warnings of unsafe conditions may be conducted in substantially the same way as described herein for picking up other pieces of cargo.

A seventeenth objective may include driving up the ramp and back into a warehouse within the virtual reality environment. The user may drive the virtual reality forklift using the steering wheel, shift lever, acceleration trigger, and brake trigger. The user may be provided with the warnings described herein when the user creates unsafe conditions.

An eighteenth objective may include placing the second cargo on a shelf of a cargo shelf. Placing the second cargo on the shelf may require the user to raise or lower the tynes, and therefore the second cargo, to the correct height, move the cargo into position over the shelf by driving forward, lower the second cargo on to the shelf, and reverse away from the second cargo to pull the tynes out of the slots of the second pallet to place the second cargo on the shelf. In some examples, the correct height may be about six inches above the shelf. In some examples, the cargo shelf may have one, two, three, four, five, or six shelves, increasing the difficulty of placing the second cargo on the correct shelf. Warnings may be displayed as described herein if the user creates unsafe conditions.

In an aspect, the method may include providing guidance to the user during each objective. In some examples, the guidance may be audio guidance describing the objective or providing tips on completing the objective. In other examples, the guidance may be given on the guidance tablet describing the objective and providing tips on completing the objective. In further examples, guidance may be provided by an assist overlay system. The assist overlay system may provide markers for marked locations, distances to marked locations, highlights and visual guides for aligning the tynes with slots of a pallet, highlighting various components/controls of the virtual reality forklift for use, paths for driving the virtual reality forklift to the correct position, and a safety triangle graphic to indicate when the virtual reality forklift is operating safely, approaching unsafe operation, or operating unsafely.

In a further aspect, the method may include providing the user with an evaluation after completing each objective or completing all the objectives. In some examples, the evaluation may include the time to complete each objective, the number of successfully completed objectives, any unsafe conditions created by the user, any improper use of the virtual reality forklift, failure of objectives, time spent using the virtual reality forklift simulator, and a comparison of the user's performance to the user's past performance. In other examples, the evaluation may provide a comparison of the user's performance to other user's or a comparison of the user's performance to an industry standard performance for forklift operation.

It will be appreciated that the objectives described herein may be arranged in different orders. Further, the virtual reality forklift simulator is designed such that it is open-ended, therefore a user may complete the objectives in any way they imagine. The virtual reality forklift simulator may also have a "free play" mode, where the user may manipulate the virtual reality forklift and the virtual reality forklift environment in any way they imagine without having a set objective. In some examples, the methods and systems described herein may be performed on a computing system.

Further described herein is a non-transitory computer readable medium storing instructions configured to allow a processor to run a virtual reality forklift simulator having physics simulations. The computer readable medium (CRM) may include volatile media, nonvolatile media, removable media, non-removable media, and/or other available media that can store instructions for the virtual reality forklift simulator. The processor may be configured to receive one or more inputs from a user to operate the virtual reality forklift simulator. In some examples, the processor may be a CPU.

In an aspect, the computing system may store instructions for performing operations based on inputs received from a user. The user may provide inputs to the computing system using a right hand controller, a left hand controller, and a headset. The instructions may further provide guidance and/or warnings to the user based on the user's inputs. In some examples, the inputs to the computing system may be the inputs (e.g., pressing of buttons on the hand controllers, movement of the headset, movements of the hand controllers etc.) described herein. In an example, the processor may configured to provide corresponding movements, warnings, and guidance described herein based on the inputs from the user.

In some aspects, the processor may perform operations for training a user in forklift operation. In some examples, the operations may include receiving a first input from a user to boot-up a virtual reality forklift simulation, receiving one or more inputs from one or more controllers operated by the user to move a virtual reality forklift, providing guidance to the user to complete one or more objectives, providing warnings to the user of an unsafe operation of the virtual reality forklift, and receiving a shut-down input from the user to turn the virtual reality forklift simulation off.

In an aspect, data may be stored from a user session. The stored data may be used to provide an evaluation report. In some examples, the evaluation may include the time to complete each objective, the number of successfully completed objectives, any unsafe conditions created by the user, any improper use of the virtual reality forklift, time spent using the virtual reality forklift simulator, and a comparison of the user's performance to the user's past performance. In other examples, the evaluation may provide a comparison of the user's performance to other user's or a comparison of the user's performance to an industry standard performance for forklift operation. In some examples, the data from a user session may be stored on a server. In an example, the server may collect user data from multiple users and compare the data between different users to create evaluation reports.

In an aspect, the one or more controllers may include a right hand controller, a left hand controller, and a headset. The right hand controller may be configured to be grasped by a right hand of the user and have a grip button and a trigger button. The left hand controller may be configured to be grasped by the left hand of a user and have a grip button and a trigger button. The headset may be configured to allow the user to see a virtual reality environment. In some examples, the trigger button of the right hand controller may be an acceleration trigger which may send an acceleration input causing the processor to accelerate the wheels of the virtual reality forklift. In some examples, the grip button of the right hand controller may be gripped by a user and provide an input causing the processor to grasp an object in the virtual reality environment. In some examples, the trigger button of the left hand controller may send a brake input causing the processor to provide a brake (e.g., friction force) to the wheels of the virtual reality forklift to slow the virtual reality forklift down. In an example, the grip button of the left hand controller may be gripped by a user and provide an input causing the processor to grasp an object in the virtual reality environment.

In some aspects, the objectives may include driving the virtual reality forklift, loading cargo on a set of tynes of the virtual reality forklift, transporting cargo using the virtual reality forklift, and unloading cargo using the virtual reality forklift. In an example, the computing system may receive inputs from the user based on the user's use of the controllers to complete the objectives. The processor may then perform operations based on the user's inputs to the controllers to achieve the outcomes described herein.

In an aspect, the computing system may be configured to simulate a real world forklift in the virtual reality forklift simulator. The reactions of the virtual reality forklift to the user's inputs on the controllers may simulate real world forklift reactions. The forces and movements provided by the user inputs to the controllers may affect the virtual reality forklift and virtual reality environment in a substantially similar way that the inputs would effect a real world forklift.

In some aspects, the warnings may be based on unsafe conditions simulated from real world physics. For example, the computing system may be configured to calculate unsafe conditions based on forces, velocities (e.g., speeds), distances, and other physical measurements. The computing system may be configured to determine when an unsafe condition is present. Unsafe conditions may be determined when a force is provided to the virtual reality forklift from a collision with an object, when the virtual reality forklift exceeds a speed threshold, when the virtual reality forklift is provided forces that would cause a real world forklift to tip over, when cargo is provided forces that would cause the cargo to fall or otherwise be dislocated, or other unsafe conditions in a real world forklift environment. The processor may be configured to provide a warning or halt the simulation when the user creates unsafe conditions. The processor may also provide guidance or an explanation of the unsafe condition, how to avoid the unsafe condition, and provide the user with another opportunity to operate the virtual reality forklift. By simulating a real world environment, the virtual reality forklift simulator provides a risk free forklift training course. If a user was engaging in real world forklift training and created an unsafe condition, the user or another person may be injured by the unsafe condition or expensive equipment may be damaged or destroyed.

Figure 23:
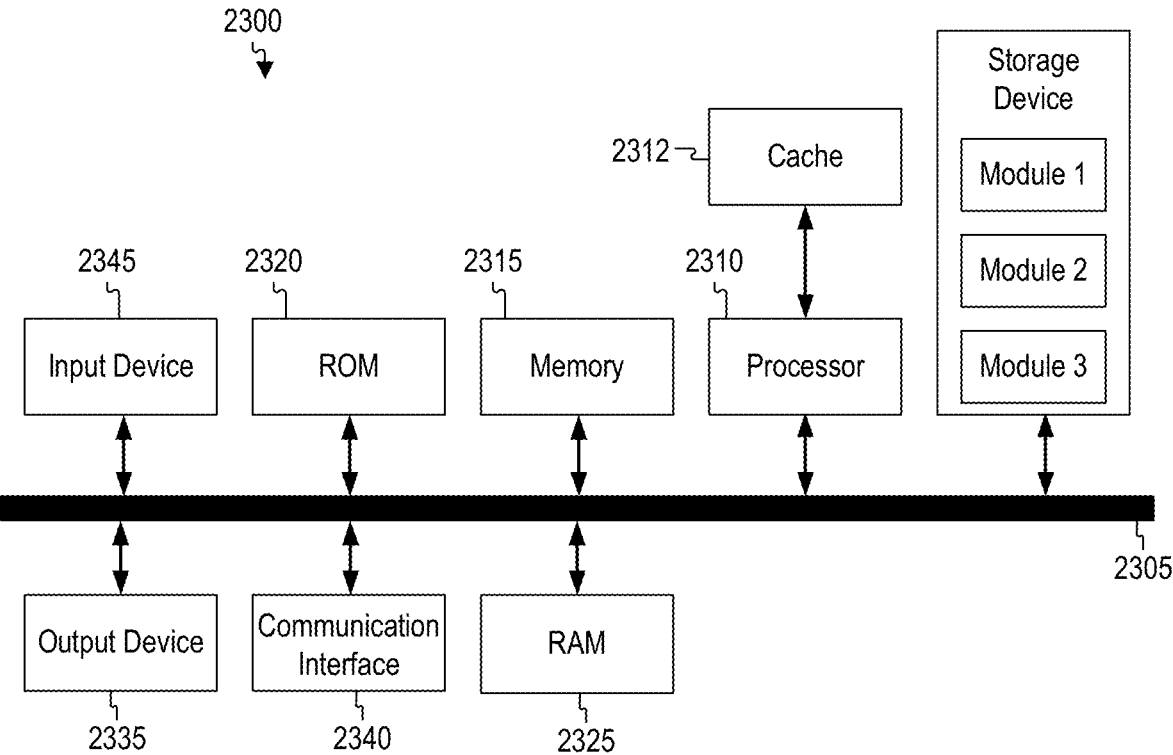
FIG. 23 is a diagram illustrating an example of a system for implementing certain aspects of the present technology.

FIG. 23 is a diagram illustrating an example of a system for implementing certain aspects of the present technology. In particular, FIG. 23 illustrates an example of computing system 2300, which can be for example any computing device making up an internal computing system, a remote computing system, a camera, or any component thereof in which the components of the system are in communication with each other using connection 2305. Connection 2305 can be a physical connection using a bus, or a direct connection into processor 2310, such as in a chipset architecture. Connection 2305 can also be a virtual connection, networked connection, or logical connection.

In some aspects, computing system 2300 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example computing system 2300 includes at least one processing unit (CPU or processor) 2310 and connection 2305 that couples various system components including system memory 2315, such as ROM 2320 and RAM 2325 to processor 2310. Computing system 2300 can include a cache 2312 of high-speed memory connected directly with, in close proximity to, or integrated as part of processor 2310.

Processor 2310 can include any general purpose processor and a hardware service or software service, such as services 2332, 2334, and 2336 stored in storage device 2330, configured to control processor 2310 as well as a special-purpose processor where software instructions are incorporated into the actual processor design. Processor 2310 may essentially be a completely self-contained computing system, containing multiple cores or processors, a bus, memory controller, cache, etc. A multi-core processor may be symmetric or asymmetric.

To enable user interaction, computing system 2300 includes an input device 2345, which can represent any number of input mechanisms, such as a microphone for speech, a touch-sensitive screen for gesture or graphical input, keyboard, mouse, motion input, speech, etc. Computing system 2300 can also include output device 2335, which can be one or more of a number of output mechanisms. In some instances, multimodal systems can enable a user to provide multiple types of input/output to communicate with computing system 2300. Computing system 2300 can include communications interface 2340, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a Bluetooth® wireless signal transfer, a BLE wireless signal transfer, an IBEACON® wireless signal transfer, an RFID wireless signal transfer, near-field communications (NFC) wireless signal transfer, dedicated short range communication (DSRC) wireless signal transfer, 802.11 WiFi wireless signal transfer, WLAN signal transfer, Visible Light Communication (VLC), Worldwide Interoperability for Microwave Access (WiMAX), IR communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 2340 may also include one or more Global Navigation Satellite System (GNSS) receivers or transceivers that are used to determine a location of the computing system 2300 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 2330 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, RAM, static RAM (SRAM), dynamic RAM (DRAM), ROM, programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/Re-RAM), phase change memory (PCM), spin transfer torque RAM (STT-RAM), another memory chip or cartridge, and/or a combination thereof.

The storage device 2330 can include software services, servers, services, etc., that when the code that defines such software is executed by the processor 2310, it causes the system to perform a function. In some aspects, a hardware service that performs a particular function can include the software component stored in a computer-readable medium in connection with the necessary hardware components, such as processor 2310, connection 2305, output device 2335, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as CD or DVD, flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces can be configured to communicate and/or receive wired and/or wireless data, including data according to the 3G, 4G, 5G, and/or other cellular standard, data according to the Wi-Fi (802.11x) standards, data according to the Bluetooth™ standard, data according to the IP standard, and/or other types of data.

The components of the computing device can be implemented in circuitry. For example, the components can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but may have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices, or other small form factor personal computers, personal digital assistants, rackmount devices, standalone devices, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as RAM such as synchronous dynamic random access memory (SDRAM), ROM, non-volatile random access memory (NVRAM), EEPROM, flash memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more DSPs, general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

The disclosures shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the examples described above may be modified within the scope of the appended claims.

What is claimed is:

1. A method of training a user in forklift operation, the method comprising:

booting up a virtual reality forklift simulator having a virtual reality environment and a physics simulation system configured to simulate a virtual reality forklift comprising a body, a set of tynes, and four wheels, the four wheels each having a rigid body and a circle collider that provides friction with virtual ground in the virtual reality environment, the virtual reality forklift further comprising four wheel colliders configured to provide a three-point suspension system for the virtual reality forklift that defines a safety triangle for a center of mass of the virtual reality forklift, wherein the virtual reality forklift simulator bases movements of the virtual reality forklift on physics simulations that dynamically update the center of mass of the virtual reality forklift based on at least a weight and a position of cargo carried on the tynes, a height and tilt of the tynes, a speed of the virtual reality forklift, and a slope of virtual ground in the virtual reality environment;

instructing the user to complete one or more objectives using a virtual reality forklift;

completing the one or more objectives using one or more controllers;

determining a respective force on each of the four wheels based on the dynamically updated center of mass of the virtual reality forklift and the three-point suspension system implemented by the four wheel colliders;

determining, based on the respective forces, a state of the safety triangle, wherein the state of the safety triangle comprises one of a safe state, an approaching unsafe state, or an unsafe state, wherein the unsafe state occurs when the respective force on one of the four wheels exceeds a support threshold;

providing guidance and/or warnings to the user based on a performance of the user in the virtual reality forklift, the guidance and/or warnings provided by an assist overlay system in the virtual reality forklift simulator, the assist overlay system comprising a safety triangle indicator that graphically indicates a level of danger to stability of the virtual reality forklift based on the safety triangle;

in response to determining the approaching unsafe state, causing the assist overlay system to display, via the safety triangle indicator, a tilted virtual reality forklift warning; and in response to determining the unsafe state or detecting at least one of a crash, a mishandling of cargo, a dropped cargo, or an excessive speed that exceeds a safety speed threshold, halting the virtual reality forklift simulator, displaying a warning describing an unsafe condition to the user, and requiring the user to restart at least a current objective of the one or more objectives before resuming operation of the virtual reality forklift.

2. The method of claim 1, wherein the one or more controllers comprise:

a right hand controller configured to be grasped by a right hand of the user, the right hand controller having a grip button and a trigger;

a left hand controller configured to be grasped by a left hand of the user, the left hand controller having a grip button and a trigger button; and a headset, wherein the headset allows the user to see the virtual reality environment, wherein pressing the grip buttons allows the user to grip an object in the virtual reality environment, wherein pressing the trigger button of the right hand controller accelerates the virtual reality forklift, and wherein pressing the trigger button of the left hand controller engages a brake on the virtual reality forklift.

3. The method of claim 2, wherein the one or more objectives comprise:

securing safety equipment of the virtual reality forklift;

driving the virtual reality forklift using various virtual reality forklift controls;

loading cargo on a set of tynes of the virtual reality forklift using the various virtual reality forklift controls;

transporting cargo using the virtual reality forklift using the various virtual reality forklift controls; and unloading cargo using the various virtual reality forklift controls.

4. The method of claim 1, wherein the guidance is one or more of an objective arrow, highlighting a slot or slots of a pallet, prompts to use various virtual reality forklift controls, audio prompts, a guidance tablet with a text description of the one or more objectives.

5. The method of claim 1, further comprising providing an evaluation to the user.

6. The method of claim 1, wherein the virtual reality forklift and the virtual reality environment simulate real world physics.

7. The method of claim 1, further comprising generating an evaluation report for the user, wherein the evaluation report comprises a time to complete each of the one or more objectives, a number of successfully complete objectives, unsafe conditions encountered, instances of improper use of the virtual reality forklift, and a comparison of past performance to current performance.

8. The method of claim 1, wherein the body has a first rigid body encompassing a lower portion of the body, a second rigid body extending to a top of an overhead guard of body, and a third rigid body encompassing a top portion of a mast of the body.

9. The method of claim 8, wherein each of the tynes has a corresponding rigid body.

10. The method of claim 9, further comprising: determining a tyne center of mass based on the corresponding rigid body of each of the tynes, wherein the center of mass of the virtual reality forklift is based, at least in part, on the tyne center of mass and the first rigid body, the second rigid body, and the third rigid body.

11. The method of claim 1, further comprising, for at least one of the one or more objectives, randomizing at least one of a weight, a size, and an initial position of cargo to be carried on the set of tynes such that, between different training sessions, the dynamically updated center of mass of the virtual reality forklift and a resulting state of the safety triangle differ for the same objective.

12. A non-transitory computer readable medium storing instructions that, when executed by at least one processor, cause the at least one processor to perform operations for training a user in forklift operation, the operations comprising:

receiving a first input from the user to boot-up a virtual reality forklift simulator having a virtual reality environment and a physics simulation system configured to simulate a virtual reality forklift comprising a body, a set of tynes, and four wheels, the four wheels each having a rigid body and a circle collider that provides friction with virtual ground in the virtual reality environment, the virtual reality forklift further comprising four wheel colliders configured to provide a three-point suspension system for the virtual reality forklift that defines a safety triangle for a center of mass of the virtual reality forklift, wherein the virtual reality forklift simulator bases movements of the virtual reality forklift on physics simulations that dynamically update the center of mass of the virtual reality forklift based on at least a weight and a position of cargo carried on the tynes, a height and tilt of the tynes, a speed of the virtual reality forklift, and a slope of virtual ground in the virtual reality environment;

receiving one or more inputs from one or more controllers operated by the user to move a virtual reality forklift to complete one or more objectives;

determining a respective force on each of the four wheels based on the dynamically updated center of mass of the virtual reality forklift and the three-point suspension system implemented by the four wheel colliders;

determining, based on the respective forces, a state of the safety triangle, wherein the state of the safety triangle comprises one of a safe state, an approaching unsafe state, or an unsafe state, wherein the unsafe state occurs when the respective force on one of the four wheels exceeds a support threshold;

providing guidance and/or warning to the user based on a performance of the user with the virtual reality forklift, the guidance and/or warnings provided by an assist overlay system in the virtual reality forklift simulator, the assist overlay system comprising a safety triangle indicator that graphically indicates a level of danger to stability of the virtual reality forklift based on the safety triangle;

in response to determining the approaching unsafe state, causing the assist overlay system to display, via the safety triangle indicator, a tilted virtual reality forklift warning; and in response to determining the unsafe state or detecting at least one of a crash, a mishandling of cargo, a dropped cargo, or an excessive speed that exceeds a safety speed threshold, halting the virtual reality forklift simulator, displaying a warning describing an unsafe condition to the user, and requiring the user to restart at least a current objective of the one or more objectives before resuming operation of the virtual reality forklift.

13. The non-transitory computer readable medium of claim 12, wherein the non-transitory computer readable medium stores data from a user session.

14. The non-transitory computer readable medium of claim 13, wherein the data comprises successful completion of objectives, failure of objectives, unsafe operations of the virtual reality forklift, and time between boot-up and shutdown.

15. The non-transitory computer readable medium of claim 12, wherein the one or more controllers comprise:

a right hand controller configured to be grasped by a right hand of the user having a grip button and a trigger button;

a left hand controller configured to be grasped by a left hand of the user having a grip button and a trigger button; and a headset configured to allow the user to see a virtual reality environment, wherein pressing the trigger button of the right hand controller sends an acceleration input to the non-transitory computer readable medium to move the virtual reality forklift, and wherein pressing the trigger button of the left hand controller sends a brake input to the non-transitory computer readable medium to slow the virtual reality forklift or stop the virtual reality forklift.

16. The non-transitory computer readable medium of claim 15, wherein the one or more objectives comprise:

securing safety equipment of the virtual reality forklift by providing inputs to the one or more controllers;

driving the virtual reality forklift by providing inputs to the one or more controllers;

loading cargo on a set of tynes of the virtual reality forklift by providing inputs to the one or more controllers;

transporting cargo using the virtual reality forklift by providing inputs to the one or more controllers; and unloading cargo by providing inputs to the one or more controllers.

17. The non-transitory computer readable medium of claim 16, wherein the user provides inputs to the right hand controller, the left hand controller, and the headset.

18. The non-transitory computer readable medium of claim 17, wherein the inputs to the right hand controller, the left hand controller, and the headset provide the inputs to the non-transitory computer readable medium causing the at least one processor to move the virtual reality forklift and objects in the virtual reality environment.

19. The non-transitory computer readable medium of claim 12, wherein the non-transitory computer readable medium and processor simulate a real world forklift in the virtual reality forklift simulator.

20. The non-transitory computer readable medium of claim 12, wherein the at least one processor is configured to provide an evaluation to the user after completion of a training session.

* * * * *